(12) United States Patent
Takeda et al.

(10) Patent No.: US 9,676,976 B2
(45) Date of Patent: Jun. 13, 2017

(54) OXYGEN-BARRIER FILM AND ADHESIVE

(75) Inventors: Hiroyuki Takeda, Sakura (JP); Keiichi Ozono, Saitama (JP); Michiya Nakashima, Yotsukaido (JP); Yoshinori Kanagawa, Osaka (JP)

(73) Assignee: DIC CORPORATION, Tokyo (JP)

( * ) Notice: Subject to any disclaimer, the term of this patent is extended or adjusted under 35 U.S.C. 154(b) by 201 days.

(21) Appl. No.: 13/805,596

(22) PCT Filed: Jun. 16, 2011

(86) PCT No.: PCT/JP2011/063816
§ 371 (c)(1),
(2), (4) Date: Mar. 1, 2013

(87) PCT Pub. No.: WO2011/162160
PCT Pub. Date: Dec. 29, 2011

(65) Prior Publication Data
US 2013/0158186 A1    Jun. 20, 2013

(30) Foreign Application Priority Data

Jun. 21, 2010  (JP) ................. 2010-140445
Oct. 13, 2010  (JP) ................. 2010-230480
Dec. 21, 2010  (JP) ................. 2010-284407
Dec. 24, 2010  (JP) ................. 2010-287710

(51) Int. Cl.
| | |
|---|---|
| B32B 7/12 | (2006.01) |
| B32B 27/08 | (2006.01) |
| B32B 27/36 | (2006.01) |
| B32B 27/40 | (2006.01) |
| C08G 18/42 | (2006.01) |
| C08G 18/76 | (2006.01) |
| C08G 18/78 | (2006.01) |
| C08G 18/80 | (2006.01) |
| C09D 175/06 | (2006.01) |
| C09J 167/00 | (2006.01) |
| C09J 167/02 | (2006.01) |
| C09J 175/04 | (2006.01) |
| C09J 175/06 | (2006.01) |

(52) U.S. Cl.
CPC ............ *C09J 175/04* (2013.01); *B32B 7/12* (2013.01); *B32B 27/08* (2013.01); *B32B 27/36* (2013.01); *C08G 18/4213* (2013.01); *C08G 18/4236* (2013.01); *C08G 18/7642* (2013.01); *C08G 18/7831* (2013.01); *C08G 18/8029* (2013.01); *C09D 175/06* (2013.01); *C09J 167/00* (2013.01); *B32B 27/40* (2013.01); *B32B 2307/7244* (2013.01); *B32B 2439/70* (2013.01); *C09J 167/02* (2013.01); *C09J 175/06* (2013.01)

(58) Field of Classification Search
CPC  B32B 27/36; B32B 7/12; B32B 27/08; B32B 2307/7244; B32B 27/40; B32B 2439/70; C08G 18/7642; C08G 18/7831; C08G 18/8029; C08G 18/4213; C08G 18/4236; C09J 175/04; C09J 167/00; C09J 167/02; C09J 175/06; C09D 175/06

USPC ...... 524/589, 590; 525/437, 440.01; 528/44, 528/80, 82, 83, 84, 85; 428/34.1, 34.3, 428/35.2, 35.7, 36.8, 423.1

See application file for complete search history.

(56) References Cited

U.S. PATENT DOCUMENTS

| | | | |
|---|---|---|---|
| 4,503,189 A | 3/1985 | Igarashi et al. | |
| 5,009,884 A * | 4/1991 | Suhonen | 424/52 |
| 6,288,201 B1 | 9/2001 | Sasano et al. | |
| 8,377,508 B2 * | 2/2013 | Uemura et al. | 427/208.2 |
| 2005/0143552 A1 | 6/2005 | Ikeda et al. | |
| 2007/0059541 A1 * | 3/2007 | Yoshida et al. | 428/475.2 |
| 2010/0119821 A1 | 5/2010 | Uemura et al. | |
| 2011/0104482 A1 | 5/2011 | Yasui et al. | |

FOREIGN PATENT DOCUMENTS

| | | |
|---|---|---|
| JP | 59-115374 A | 7/1984 |
| JP | 60-243182 A | 12/1985 |
| JP | 2000-351953 A | 12/2000 |
| JP | 2001-107017 A | 4/2001 |
| JP | 2003-013032 A | 1/2003 |
| JP | 2004-010656 A | 1/2004 |
| JP | 2004-195971 A | 7/2004 |
| JP | 2005-132902 A | 5/2005 |
| JP | 2006-341423 A | 12/2006 |
| JP | 2007-217642 A | 8/2007 |
| JP | 2008-188975 A | 8/2008 |
| WO | 2008/149641 A1 | 12/2008 |
| WO | 2010/007697 A1 | 1/2010 |

OTHER PUBLICATIONS

Korshak et al., "Heterochain Polyesters, I. Polyesters of Isomeric Phthalic esters", Bulletin of the Academy of Sciences of the USSR, Division of Chemical Science, 1957, vol. 6, Issue 6, pp. 749-755.*
International Search Report for PCT/JP2011/063816, mailing date of Sep. 27, 2011.

* cited by examiner

*Primary Examiner* — Patrick Niland
(74) *Attorney, Agent, or Firm* — Westerman, Hattori, Daniels & Adrian, LLP

(57) ABSTRACT

An oxygen-barrier film and an adhesive used therefor. Provided are an adhesive, which can be used for packaging foodstuffs and contains mainly a polyester having excellent oxygen-barrier properties, and an oxygen-barrier film that uses the adhesive. The oxygen-barrier film is prepared using an adhesive that includes: an amorphous polyester polyol, which is obtained by polycondensation of a polyvalent carboxylic acid component including at least one type of ortho-oriented aromatic dicarboxylic acid or anhydride thereof, and a polyhydric alcohol including at least one compound selected from the group consisting of ethylene glycol, propylene glycol, butylene glycol, neopentyl glycol and cyclohexanedimethanol, and a curing agent capable of reacting with the amorphous polyester polyol.

19 Claims, No Drawings

OXYGEN-BARRIER FILM AND ADHESIVE

BACKGROUND OF THE INVENTION

Field of the Invention

The present invention relates to an oxygen-barrier film, and to an adhesive used therefor.

Description of Related Art

Packaging materials used in the packaging of foodstuffs and beverages and the like must exhibit a wide range of functions, including not only functions such as strength, resistance to splitting, retort resistance and heat resistance that protect the contents during various types of distribution, storage such as refrigeration, and treatments such as heat sterilization, but also functions such as superior transparency that enable the contents to be viewed. On the other hand, when a bag is sealed by heat-sealing, an unstretched polyolefin film having excellent hot workability is essential, but unstretched polyolefin films exhibit many functions that are unsatisfactory as packaging materials.

For these types of reasons, composite flexible films composed of a combination of different polymer materials are widely used as the packaging materials mentioned above. These composite films are generally formed from an outer layer composed of a thermoplastic plastic film layer or the like that protects the merchandise and exhibits various functions, and a thermoplastic plastic film layer or the like that functions as a sealant layer. These layers may be bonded together using a method in which the thermoplastic plastic for the outer layer, an adhesive and the thermoplastic plastic for the sealant layer are subjected to three-layer melt extrusion to form an unstretched laminated sheet, and this laminated sheet is then stretched (for example, see Patent Document 1), but a dry lamination method in which an adhesive is applied to a laminate film layer, and the sealant layer is then bonded to the adhesive to produce a multilayer film (for example, see Patent Document 2) is simple to perform, and therefore widely used. However, the adhesive used for this application usually only performs the function of bonding the different films together.

Recently, even higher levels of functionality are being required of multilayer films, and oxygen-barrier properties that prevent the penetration of external oxygen in order to inhibit oxidation, carbon dioxide-barrier properties, and barrier properties relative to various odor components are now being demanded, with the purpose of enabling long-term storage of foodstuffs. When imparting barrier functions to a multilayer film, the unstretched polyolefin films typically used as the inner layer (on the sealant side) exhibit poor gas barrier properties, and imparting these films with barrier functions by coating or vapor deposition is difficult. As a result, the various films used for the outer layer (including polyester resins such as polyethylene terephthalate (hereafter abbreviated as PET), polyamide resins, and stretched polyolefin resins) are often imparted with barrier functions.

In those cases where coating is used to impart these outer layer films with barrier functions, one example of a widely used barrier coating material is vinylidene chloride, which exhibits superior oxygen-barrier properties and water vapor-barrier properties, but there are problems associated with the use of vinylidene chloride, including the generation of dioxin when the material is incinerated during disposal. Further, polyvinyl alcohol resins and ethylene-vinyl alcohol copolymers have also been used as barrier coating materials, but although these materials exhibit favorable oxygen-barrier properties under low humidity, they suffer from poor oxygen-barrier properties under high humidity, and inferior boiling resistance and retort resistance. On the other hand, films having a vapor deposited layer of a metal such as aluminum provided as a gas barrier layer are opaque, meaning the internal contents cannot be viewed, and are also unable to be used in microwave ovens. Further, films having a vapor deposited layer of a metal oxide such as silica or alumina provided as a gas barrier layer are expensive, and suffer from poor flexibility, resulting in a large variation in the gas barrier properties due to cracking and pinholes.

On the other hand, a method in which the adhesive used during lamination is imparted with oxygen-barrier properties is also known. This method offers the advantage that a barrier film can be produced even without using a special film that has been imparted with gas barrier properties by performing specific steps or employing a specific configuration during preparation of the laminated film. However, the type of flexible molecular structure that is required for an adhesive generally exhibits a high level of gas permeability. Accordingly, the adhesive performance and the barrier function often exist in a trade-off type relationship, and addressing this problem is technically difficult.

Examples of this type of gas barrier material that can be used as an adhesive for a laminated film include a resin described in Patent Document 3, which discloses a gas barrier composite film that uses a thermosetting bas-barrier polyurethane resin containing a resin cured product obtained by reacting an active hydrogen-containing compound with an organic polyisocyanate compound, wherein the resin cured product contains at least 20% by mass of skeletal structures derived from meta-xylene diisocyanate, and wherein within the active hydrogen-containing compound and the organic polyisocyanate compound, the proportion of compounds having three or more functional groups represents at least 7% by mass of the total mass of the active hydrogen-containing compound and the organic polyisocyanate compound.

However, this resin suffers from poor laminate strength with various films used as the aforementioned outer layer, and particularly when used with PET/CPP (cast polypropylene, hereafter abbreviated as CPP) film, which is widely used as a packaging for foodstuffs.

Further, Patent Documents 4 and 5 disclose the use of an epoxy resin cured product and/or a polyurethane resin cured product derived from meta-xylylene diamine as an adhesive that exhibits excellent oxygen-barrier properties.

However, these techniques require that the adhesive contains meta-xylylene structures derived from an expensive monomer in a high proportion (of at least 40% by mass, with some of the disclosed examples containing 50% by mass or more), and therefore a problem arises in that the packaging material becomes very expensive.

PATENT DOCUMENTS

Patent Document 1: Japanese Unexamined Patent Application, First Publication No. 2006-341423
Patent Document 2: Japanese Unexamined Patent Application, First Publication No. 2003-13032
Patent Document 3: Japanese Unexamined Patent Application, First Publication No. 2004-10656
Patent Document 4: Japanese Unexamined Patent Application, First Publication No. 2004-195971
Patent Document 5: Japanese Unexamined Patent Application, First Publication No. 2008-188975

SUMMARY OF THE INVENTION

An object of the present invention is to provide an adhesive containing mainly polyester that can be used for packaging foodstuffs and exhibits excellent oxygen-barrier properties, and also to provide an oxygen-barrier film that uses the adhesive.

Means to Solve the Problems

The inventors of the present invention discovered that the above object could be achieved by employing an oxygen-barrier film that uses an adhesive containing an amorphous polyester polyol, which is obtained by polycondensation of a polyvalent carboxylic acid component including at least one type of ortho-oriented aromatic dicarboxylic acid or anhydride thereof, and a polyhydric alcohol including at least one compound selected from the group consisting of ethylene glycol, propylene glycol, butylene glycol, neopentyl glycol and cyclohexanedimethanol, and a curing agent capable of reacting with the amorphous polyester polyol.

Further, the present invention also provides an oxygen-barrier film prepared by bonding together a plurality of resin films of the same type or different types, wherein the adhesive described above is used as the adhesive.

Effect of the Invention

The present invention is able to provide a polyester adhesive that exhibits excellent oxygen-barrier properties while maintaining satisfactory adhesion between the substrates, as well as providing an oxygen-barrier film that uses the adhesive.

BEST MODE FOR CARRYING OUT THE INVENTION (Adhesive: Amorphous Polyester Polyol)

The amorphous polyester polyol used in the present invention is formed from a polyvalent carboxylic acid component containing at least one type of ortho-phthalic acid or anhydride thereof, and a polyhydric alcohol component containing at least one compound selected from the group consisting of ethylene glycol, propylene glycol, butylene glycol, neopentyl glycol and cyclohexanedimethanol. An amorphous polyester polyol in which the amount of the ortho-phthalic acid or anhydride thereof relative to the total mass of the polyvalent carboxylic acid component is within a range from 70 to 100% by mass is particularly preferred.

(Ortho-Phthalic Acid and Anhydride Thereof)

Ortho-phthalic acid and the anhydride thereof have asymmetric structures. It is surmised that this inhibits rotation of the molecular chain of the obtained polyester, thereby yielding superior oxygen-barrier properties. Further, it is also thought that, because of this asymmetric structure, the resulting polyester is amorphous and the glass transition temperature (Tg) is room temperature or lower, resulting in good substrate adhesion, meaning the resin exhibits both favorable adhesive strength and superior oxygen-barrier properties. Moreover, the polyester also exhibits excellent handling properties including good solubility in solvents, which is essential when used as an adhesive for dry lamination.

(Polyvalent Carboxylic Acid: Other Components)

In the amorphous polyester polyol of the present invention, the ortho-phthalic acid or anhydride thereof described above is an essential component of the polyvalent carboxylic acid component, but other polyvalent carboxylic acid components may also be included in the copolymerization, provided their inclusion does not impair the effects of the present invention. Specifically, polybasic acids including aliphatic polyvalent carboxylic acids such as succinic acid, adipic acid, azelaic acid, sebacic acid and dodecanedicarboxylic acid; unsaturated bond-containing polyvalent carboxylic acids such as maleic anhydride, maleic acid and fumaric acid; alicyclic polyvalent carboxylic acids such as 1,3-cyclopentanedicarboxylic acid and 1,4-cyclohexanedicarboxylic acid; aromatic polyvalent carboxylic acids such as terephthalic acid, isophthalic acid, pyromellitic acid, trimellitic acid, 1,4-naphthalenedicarboxylic acid, 2,5-naphthalenedicarboxylic acid, 2,6-naphthalenedicarboxylic acid, naphthalic acid, biphenyldicarboxylic acid, 1,2-bis(phenoxy)ethane-p,p'-dicarboxylic acid, and anhydrides or ester-forming derivatives of these dicarboxylic acids; as well as p-hydroxybenzoic acid, p-(2-hydroxyethoxy)benzoic acid, and ester-forming derivatives of these dihydroxycarboxylic acids may be used either individually, or in mixtures containing two or more compounds. Among these compounds, succinic acid, 1,3-cyclopentanedicarboxylic acid and isophthalic acid are preferred.

(Polyhydric Alcohol Component)

The polyhydric alcohol used in the present invention includes at least one compound selected from the group consisting of ethylene glycol, propylene glycol, butylene glycol, neopentyl glycol and cyclohexanedimethanol. Of these, considering that a smaller number of carbon atoms between oxygen atoms prevents the molecular chain from becoming too flexible, and should therefore inhibit oxygen permeation, the use of ethylene glycol is most desirable.

(Polyhydric Alcohol: Other Components)

In the present invention, the polyhydric alcohol component described above is an essential component, but other polyvalent carboxylic acid components may also be included in the copolymerization, provided their inclusion does not impair the effects of the present invention. Specific examples include aliphatic diols such as 1,5-pentanediol, 3-methyl-1,5-pentanediol, 1,6-hexanediol, methylpentanediol, dimethylbutanediol, butyl ethylpropanediol, diethylene glycol, triethylene glycol, tetraethylene glycol, dipropylene glycol and tripropylene glycol; aromatic polyhydric phenols such as hydroquinone, resorcinol, catechol, naphthalenediol, biphenol, bisphenol A, bisphenol F and tetramethylbiphenol; and ethylene oxide adducts and hydrogenated alicyclic derivatives of these compounds.

(Amorphous Polyester Polyol having Isocyanuric Ring)

The amorphous polyester polyol compound of the present invention preferably contains an amorphous polyester polyol having an isocyanuric ring represented by general formula (1) shown below.

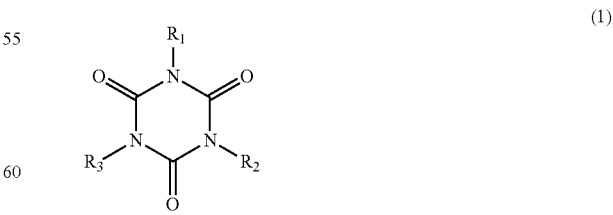

In general formula (1), each of $R_1$ to $R_3$ independently represents $-(CH_2)_{n1}-OH$ (wherein n1 represents an integer of 2 to 4), or a group represented by general formula (2) shown below:

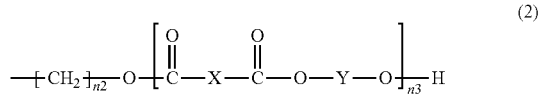

(2)

wherein n2 represents an integer of 2 to 4, n3 represents an integer of 1 to 5, X represents an arylene group selected from the group consisting of a 1,2-phenylene group, 1,2-naphthylene group, 2,3-naphthylene group, 2,3-anthraquinonediyl group and 2,3-anthracenediyl group, wherein the arylene group may contain a substituent, and Y represents an alkylene group of 2 to 6 carbon atoms, provided that at least one of $R_1$, $R_2$ and $R_3$ is a group represented by general formula (2).

In general formula (1), the alkylene group represented by $—(CH_2)_{n1}—$ may be either linear or branched. n1 is preferably 2 or 3, and is most preferably 2.

In general formula (2), n2 represents an integer of 2 to 4, and n3 represents an integer of 1 to 5.

X represents an arylene group selected from the group consisting of a 1,2-phenylene group, 1,2-naphthylene group, 2,3-naphthylene group, 2,3-anthraquinonediyl group and 2,3-anthracenediyl group, wherein the arylene group may contain a substituent. In those cases where X is substituted with a substituent, it may be substituted with either one substituent or a plurality of substituents, and the substituent(s) may be bonded to any of the carbon atoms other than the carbon atoms to which the leaving groups are bonded. Examples of the substituent include a chloro group, bromo group methyl group, ethyl group, i-propyl group, hydroxyl group, methoxy group, ethoxy group, phenoxy group, methylthio group, phenylthio group, cyano group, nitro group, amino group, phthalimide group, carboxyl group, carbamoyl group, N-ethylcarbamoyl group, phenyl group and naphthyl group.

Among the above possibilities, the substituent within the X group is preferably a hydroxyl group, cyano group, nitro group, amino group, phthalimide group, carbamoyl group, N-ethylcarbamoyl group or phenyl group, and is most preferably a hydroxyl group, phenoxy group, cyano group, nitro group, phthalimide group or phenyl group.

In general formula (2), Y represents an alkylene group of 2 to 6 carbon atoms such as an ethylene group, propylene group, butylene group, neopentylene group, 1,5-pentylene group, 3-methyl-1,5-pentylene group, 1,6-hexylene group, methylpentylene group and dimethylbutylene group. Among these, Y is preferably a propylene group or an ethylene group, and most preferably an ethylene group.

In general formula (1), at least one of $R_1$, $R_2$ and $R_3$ is a group represented by general formula (2). Compounds in which $R_1$, $R_2$ and $R_3$ are all groups represented by general formula (2) are particularly desirable.

Further, mixtures of two or more compounds selected from among compounds in which one of $R_1$, $R_2$ and $R_3$ is a group represented by general formula (2), compounds in which two of $R_1$, $R_2$ and $R_3$ are groups represented by general formula (2), and compounds in which $R_1$, $R_2$ and $R_3$ are all groups represented by general formula (2) may also be used.

The amorphous polyester polyol compound having an isocyanuric ring represented by general formula (1) is obtained by conducting a reaction using a triol having an isocyanuric ring, an aromatic polyvalent carboxylic acid having a carboxylic acid group substituted at the ortho-position or the anhydride thereof, and a polyhydric alcohol component as essential reaction components.

Examples of the triol having an isocyanuric ring include alkylene oxide adducts of isocyanuric acid such as 1,3,5-tris(2-hydroxyethyl)isocyanuric acid and 1,3,5-tris(2-hydroxypropyl)isocyanuric acid.

Further, examples of the aromatic polyvalent carboxylic acid having a carboxylic acid group substituted at the ortho-position or the anhydride thereof include ortho-phthalic acid or the anhydride thereof, naphthalene-2,3-dicarboxylic acid or the anhydride thereof, naphthalene-1,2-dicarboxylic acid or the anhydride thereof, anthraquinone-2,3-dicarboxylic acid or the anhydride thereof, and 2,3-anthracenedicarboxylic acid or the anhydride thereof. These compounds may also include a substituent on an arbitrary carbon atom within the aromatic rings.

Examples of the substituent include a chloro group, bromo group, methyl group, ethyl group, i-propyl group, hydroxyl group, methoxy group, ethoxy group, phenoxy group, methylthio group, phenylthio group, cyano group, nitro group, amino group, phthalimide group, carboxyl group, carbamoyl group, N-ethylcarbamoyl group, phenyl group and naphthyl group.

Furthermore, examples of the polyhydric alcohol component include alkylene diols of 2 to 6 carbon atoms. Specific examples include diols such as ethylene glycol, propylene glycol, butylene glycol, neopentyl glycol, 1,5-pentanediol, 3-methyl-1,5-pentanediol, 1,6-hexanediol, methylpentanediol and dimethylbutanediol.

Among the above possibilities, an amorphous polyester polyol compound having an isocyanuric ring obtained using 1,3,5-tris(2-hydroxyethyl)isocyanuric acid or 1,3,5-tris(2-hydroxypropyl)isocyanuric acid as the triol compound having an isocyanuric ring, using ortho-phthalic anhydride as the aromatic polyvalent carboxylic acid having a carboxylic acid group substituted at the ortho-position or the anhydride thereof, and using ethylene glycol as the polyhydric alcohol yields particularly superior oxygen-barrier properties, and is therefore preferred.

Specific examples of the aforementioned amorphous polyester polyol compound having an isocyanuric ring represented by general formula (1) include the amorphous polyester polyol obtained using 1,3,5-tris(2-hydroxyethyl) isocyanuric acid as the triol, ortho-phthalic anhydride as the aromatic polyvalent carboxylic acid, and ethylene glycol as the polyhydric alcohol (hereafter abbreviated as THEI(o-PAEG)n), the amorphous polyester polyol obtained using 1,3,5-tris(2-hydroxyethyl)isocyanuric acid as the triol, naphthalene-2,3-dicarboxylic acid as the aromatic polyvalent carboxylic acid, and ethylene glycol as the polyhydric alcohol (hereafter abbreviated as THEI(oNAEG)n), the amorphous polyester polyol obtained using 1,3,5-tris(2-hydroxypropyl)isocyanuric acid as the triol, ortho-phthalic anhydride as the aromatic polyvalent carboxylic acid, and ethylene glycol as the polyhydric alcohol (hereafter abbreviated as THPI(oPAEG)n), and the amorphous polyester polyol obtained using 1,3,5-tris(2-hydroxypropyl)isocyanuric acid as the triol, naphthalene-2,3-dicarboxylic anhydride as the aromatic polyvalent carboxylic acid, and ethylene glycol as the polyhydric alcohol (hereafter abbreviated as THPI(oNAEG)).

The isocyanuric ring is highly polar and is trifunctional. Accordingly, the polarity of the entire system can be increased, and the cross-linking density can be increased. For these reasons, the isocyanuric ring preferably represents 5% by mass or more of the total resin solid fraction of the adhesive.

The reasons that an adhesive of the present invention containing an isocyanuric ring is able to ensure favorable oxygen-barrier properties and favorable dry lamination adhesion are thought to include the following.

The isocyanuric ring is highly polar and does not form hydrogen bonds. Known methods for enhancing the adhesive properties generally involve the addition of high-polarity functional groups such as hydroxyl groups, urethane linkages, ureido linkages, and amide linkages, but resins having these types of linkages readily form intermolecular hydrogen bonds, resulting in a deterioration in the solubility within solvents such as ethyl acetate and 2-butanone typically used in dry lamination adhesives. In contrast, a polyester resin containing an isocyanuric ring suffers no such deterioration in solubility, and can be readily diluted.

Further, because the isocyanuric ring is trifunctional, an amorphous polyester polyol compound having the isocyanuric ring as the center of the resin skeleton, with polyester chains of a specific structure branching from the isocyanuric ring, is able to achieve high cross-linking density. It is surmised that increasing the cross-linking density is able to reduce the gaps through with gases such as oxygen can pass. In this manner, it is thought that because the isocyanuric ring is highly polar without forming intermolecular hydrogen bonds, and also yields a high cross-linking density, it is able to provide a combination of favorable oxygen-barrier properties and favorable dry lamination adhesion.

The isocyanuric ring content in the present invention is calculated relative to the mass of the total solid fraction of the adhesive resin of the present invention, using formula (a) below to determine the amount, within the adhesive resin, of the residue obtained upon removing $R_1$ to $R_3$ from general formula (1) ($C_3N_3O_3$=126.05).

$$\{[(\text{number of mols of isocyanuric ring within one molecule of } P1\times 126.05)/(\text{number-average molecular weight of one molecule of } P1)\times \text{weight used of } P]/\text{weight of total solid fraction of adhesive resin}\}\times 100 \quad \text{Formula (a)}$$

P: the amorphous polyester polyol compound having an isocyanuric ring
(Method of Calculating Mass of Total Solid Fraction of Adhesive Resin)

The mass determined by subtracting the mass of the diluent solvent, the mass of volatile component(s) contained within the curing agent, and the mass of inorganic components from the mass of the entire adhesive composition is deemed to be the mass of the total solid fraction of the adhesive resin.

The amorphous polyester polyol having an isocyanuric ring can be obtained using a conventional polyester production method. Specifically, the amorphous polyester polyol can be synthesized by performing the reaction in the presence of a catalyst, at a reaction temperature of 200 to 220° C., and with the generated water being removed continuously from the system.

In one specific example, the triol having an isocyanuric ring, the aromatic polyvalent carboxylic acid having a carboxylic acid group substituted at the ortho-position or the anhydride thereof, and the polyhydric alcohol component that represent the reaction raw materials are combined in a single batch, the temperature is raised with constant stirring, and a dehydration-condensation reaction is performed. The targeted amorphous polyester polyol can be obtained by continuing the reaction until the acid value obtained from the acid value measurement method disclosed in JIS-K0070 is 1 mgKOH/g or less, and the hydroxyl value (Z mgKOH/g) obtained using the hydroxyl value measurement method disclosed in JIS-K0070 is within ±5% of the numerical value (mgKOH/g) represented by the right side of formula (b) shown below.

$$Z=3/((\text{molecular weight of potassium hydroxide})\times 1,000\times Mn) \quad \text{Formula (b)}$$

In formula (b), Mn represents the set number-average molecular weight of a prescribed trifunctional amorphous polyester polyol.

Alternatively, each of the raw materials may be reacted individually over a plurality of stages. Further, the diol component that volatilizes at the reaction temperature may be followed, and adjusted so that the hydroxyl value is within ±5% of the specified range.

Examples of catalysts that may be used in the reaction include tin-based catalysts such as monobutyltin oxide and dibutyltin oxide, titanium-based catalysts such as tetra-isopropyl titanate and tetra-butyl titanate, and zirconia-based catalysts such as tetra-butyl zirconate. The use of a combination of an aforementioned titanium-based catalyst such as tetra-isopropyl titanate or tetra-butyl titanate with an aforementioned zirconia catalyst, which provides particularly high activity for ester reactions, is particularly preferred. The amount used of the catalyst is typically within a range from 1 to 1,000 ppm, and preferably from 10 to 100 ppm, relative to the total mass of reaction raw materials. If this amount of the catalyst is less than 1 ppm, then achieving a satisfactory catalytic effect becomes difficult, whereas if the amount exceeds 1,000 ppm, then the subsequent urethanization reaction tends to be inhibited.

A number-average molecular weight for the amorphous polyester polyol that is within a range from 450 to 5,000 is particularly preferred, as it yields a cross-linking density that results in an excellent balance between the adhesive performance and the oxygen-barrier performance. Further, a polyisocyanate described below is most preferred as the curing agent, as it produces an appropriate curing time and yields an excellent balance between the adhesive strength and the oxygen-barrier performance. The cross-linking density at this point is preferably within a range from 0.4 to 4.5 mmol/g. The urethane group concentration at this point is preferably within a range from 1.0 to 6.0 mmol/g.

The amorphous polyester polyol used in the present invention preferably has a glass transition temperature within a range from −30° C. to 80° C. The glass transition temperature is more preferably from −25° C. to 60° C. If the glass transition temperature is higher than 80° C., then the flexibility of the amorphous polyester polyol at temperatures near room temperature tends to worsen, causing a deterioration in the adhesion to substrates which may cause a reduction in the adhesive strength. In contrast, if the glass transition temperature is lower than −30° C., then molecular movement of the amorphous polyester polyol at temperatures near room temperature becomes very vigorous, which increases the possibility of unsatisfactory oxygen-barrier properties.

(Adhesive: Crystalline Polyester)

Further, in the present invention, a fixed amount of a crystalline polyester polyol may be added to the amorphous polyester polyol described above, thereby further enhancing the oxygen-barrier performance. There are no particular limitations on the crystalline polyester used in the present invention, and conventional crystalline polyesters can be used. In the present invention, the term "crystalline" describes a material which, when subjected to differential scanning calorimetry (DSC) at a rate of temperature increase of 20° C./minute, exhibits an endothermic energy of at least 20 J/g, and preferably at least 30 J/g, at the heat absorption peak corresponding with the melting point, and the crystalline polyester satisfies this condition for crystallinity.

Specifically, although there are no particular limitations on the crystalline polyester provided it satisfies the above condition for crystallinity, aliphatic crystalline polyesters produced by performing a polycondensation using an aliphatic dicarboxylic acid and an aliphatic diol as the main reaction components are particularly preferred. The aliphatic dicarboxylic acid is preferably a linear aliphatic dicarboxylic acid of 4 to 12 carbon atoms, and specific examples include succinic acid, adipic acid, azelaic acid, sebacic acid, decanedioic acid and dodecanedioic acid. Among these, from the viewpoints of reactivity with the aliphatic diol and promoting solidification, succinic acid and adipic acid are preferred. Among crystalline polyesters, aliphatic crystalline polyesters have comparatively low melting points, thus facilitating melt mixing processing, and can easily be mixed uniformly with the amorphous polyester, meaning a smooth coating surface can be formed easily, which tends to stabilize the oxygen-barrier performance.

The aliphatic diol is preferably a linear aliphatic diol of 2 to 12 carbon atoms. Specific examples of the aliphatic diol include ethylene glycol, 1,3-propanediol, 1,4-butanediol, 1,5-pentanediol, neopentyl glycol, 1,6-hexanediol, 1,10-decanediol, 1,12-dodecanediol, 2,2-diethylpropanediol, 2-ethyl-2-butyl-propanediol and cyclohexanedimethanol. Among these, ethylene glycol, 1,3-propanediol, 1,4-butandiol, 1,5-pentanediol, neopentyl glycol, 1,6-hexanediol, 1,10-decanediol and 1,12-dodecanediol are preferred, and ethylene glycol, 1,4-butandiol, 1,10-decanediol, 1,12-dodecanediol and 1,6-hexanediol are particularly desirable.

These aliphatic dicarboxylic acids and aliphatic diols may be used individually, or as mixtures containing two or more compounds, and the crystalline polyester may also be a mixture.

Moreover, provided the above condition for crystallinity is satisfied, a semi-aromatic amorphous polyester polyol obtained by performing a polycondensation of an aliphatic dicarboxylic acid and an aromatic diol, or an aromatic dicarboxylic acid and an aliphatic diol, may also be used. In such a case, examples of the aromatic diol include 1,3-bis(hydroxyethyl)benzene, hydroquinone, resorcin, catechol, 4,4'-dihydroxydiphenyl, 4,4'-dihydroxybenzophenone, 4,4'-dihydroxydiphenylmethane, 4,4'-dihydroxydiphenylethane, 4,4'-dihydroxydiphenyl ether, 2,2-bis(4-hydroxyphenyl)propane, 4,4'-dihydroxydiphenyl sulfone, 4,4'-dihydroxydiphenyl sulfide, 2,6-dihydroxynaphthalene and 1,5-dihydroxynaphthalene, and examples of the aromatic dicarboxylic acid include terephthalic acid, isophthalic acid, 1,4-naphthalenedicarboxylic acid, 2,5-naphthalenedicarboxylic acid, 2,6-naphthalenedicarboxylic acid, naphthalic acid, biphenyldicarboxylic acid, diphenic acid and anhydrides thereof.

In addition, fully aromatic polyesters (liquid crystal polymers) obtained either by performing a polycondensation of an aforementioned aromatic diol and an aforementioned aromatic dicarboxylic acid, or by performing a polycondensation of a monomer containing both a hydroxyl group and a carboxylic acid within the aromatic ring, such as p-hydroxybenzoic acid, m-hydroxybenzoic acid, o-hydroxybenzoic acid, 2-hydroxy-3-naphthoic acid or 2-hydroxy-6-naphthoic acid, may also be used.

The production method for the crystalline polyester described above may be the same as the synthesis method described above for the amorphous polyester polyol.

The number-average molecular weight of the crystalline polyester is preferably within a range from 500 to 5,000, as this ensures that the mixture with the amorphous polyester polyol exhibits superior coating properties. Further, crystalline polyester polyols in which the terminals of the crystalline polyester are alcohols are particularly desirable, as they enable the crystalline polyester polyol to also undergo reaction with the curing agent, thereby incorporating the crystalline polyester polyol within the cured adhesive structure.

Generally, crystalline polyesters exhibit superior oxygen-barrier properties as a result of the strong cohesion between molecular chains, but the solubility of crystalline polyesters in solvents is extremely poor, making them unsuitable as laminate adhesives. However, by using a crystalline polyester in a mixture with an amorphous polyester polyol having excellent oxygen-barrier properties as in the present invention, an adhesive can be obtained that exhibits excellent handling properties and particularly superior oxygen-barrier properties.

The blend ratio between the amorphous polyester polyol and the crystalline polyester is preferably within a range from (amorphous polyester polyol/crystalline polyester)= 98/2 to 50/50 (% by mass), and more preferably from 95/5 to 60/40. If the proportion of the crystalline polyester is less than 2% by mass, then the effect of the crystalline polyester in increasing the oxygen-barrier properties is negligible, whereas if the proportion of the crystalline polyester exceeds 50% by mass, then the coating properties may be significantly impaired making the adhesive unsuitable as a dry lamination adhesive.

(Adhesive: Curing Agent)

There are no particular limitations on the curing agent used in the present invention, provided it is capable of reacting with the hydroxyl groups and residual carboxylic acid groups of the amorphous polyester polyol, and conventional curing agents such as polyisocyanates and epoxy compounds can be used. Among these curing agents, from the viewpoints of adhesiveness and retort resistance, the use of a polyisocyanate is preferred.

Polyisocyanate compounds include aromatic and aliphatic diisocyanates and trivalent or higher polyisocyanates, and either a low-molecular weight compound or a polymeric compound may be used. Specific examples include tetramethylene diisocyanate, hexamethylene diisocyanate, toluene diisocyanate, diphenylmethane diisocyanate, hydrogenated diphenylmethane diisocyanate, xylylene diisocyanate, hydrogenated xylylene diisocyanate and isophorone diisocyanate; trimers of these isocyanate compounds; and terminal isocyanate group-containing compounds obtained by reacting an excess of one of these isocyanates either with a low-molecular weight active hydrogen compound such as ethylene glycol, propylene glycol, trimethylolpropane, glycerol, sorbitol, ethylenediamine, monoethanolamine, diethanolamine or triethanolamine, or with a polymeric active hydrogen-containing compound such as any of the various polyester polyols, polyether polyols or polyamides.

The isocyanate compound may also be a blocked isocyanate. Examples of the isocyanate blocking agent include phenols such as phenol, thiophenol, methylthiophenol, ethylthiophenol, cresol, xylenol, resorcinol, nitrophenol and chlorophenol; oximes such as acetoxime, methyl ethyl ketoxime and cyclohexanone oxime; alcohols such as methanol, ethanol, propanol and butanol; halogen-substituted alcohols such as ethylenechlorohydrin and 1,3-dichloro-2-propanol; tertiary alcohols such as t-butanol and t-pentanol; and lactams such as ε-caprolactam, δ-valerolactam, γ-butyrolactam and β-propylolactam; as well as aromatic amines, imides, active methylene compounds such as acetylacetone, acetoacetate esters and ethyl malonate, mercaptans, imines, ureas, diaryl compounds, and sodium bisulfate. A blocked isocyanate can be obtained by effecting an addition reaction between the aforementioned isocyanate compound and the blocking agent using an appropriate conventional method.

Among the above possibilities, xylylene diisocyanate and hydrogenated xylylene diisocyanate are preferred, and meta-xylylene diisocyanate and hydrogenated meta-xylylene diisocyanate are the most desirable.

Further, in those cases where a carboxylic acid remains at a terminal of the polyester polyol used in the present invention, an epoxy compound may also be used as the curing agent. Examples of the epoxy compound include bisphenol A diglycidyl ether and oligomers thereof, hydrogenated bisphenol A diglycidyl ether and oligomers thereof, diglycidyl ortho-phthalate, diglycidyl isophthalate, diglycidyl terephthalate, diglycidyl p-oxybenzoate, diglycidyl tetrahydrophthalate, diglycidyl hexahydrophthalate, diglycidyl succinate, diglycidyl adipate, diglycidyl sebacate, ethylene glycol diglycidyl ether, propylene glycol diglycidyl ether, 1,4-butanediol diglycidyl ether, 1,6-hexanediol diglycidyl ether, polyalkylene glycol diglycidyl ethers, triglycidyl trimellitate, triglycidyl isocyanurate, 1,4-diglycidyloxybenzene, diglycidylpropylene urea, glycerol triglycidyl ether, trimethylolethane triglycidyl ether, trimethylolpropane triglycidyl ether, pentaerythritol tetraglycidyl ether, and triglycidyl ethers of glycerol alkylene oxide adducts.

The aforementioned amorphous polyester polyol and the curing agent are blended so that the ratio between the hydroxyl groups within the amorphous polyester polyol and the reactive component of the curing agent is preferably within a range from 1/0.5 to 1/5 (equivalence ratio), and more preferably from 1/1 to 1/3. If the above range is exceeded and the curing agent component exists in excess, then the excess curing agent component remains within the adhesive, and may bleed out from the adhesive layer following adhesion, whereas if the amount of the curing agent component is insufficient, then the adhesive strength may be unsatisfactory. In the present invention, a plurality of different curing agents may be used in combination if desired.

The curing agent may also be used in combination with a conventional curing agent or adhesion promoter selected in accordance with the type of curing agent. Examples of the adhesion promoter include coupling agents, including silane coupling agents such as hydrolyzable alkoxysilane compounds, titanate coupling agents and aluminum-based coupling agents, and epoxy resins. Silane coupling agents and titanate coupling agents are also preferred in terms of improving the adhesion to various film materials.

(Adhesive: Other Components)

The adhesive of the present invention may also include various additives, provided their addition does not impair the gas barrier properties. Examples of these additives include inorganic fillers such as silica, alumina, mica, talc, aluminum flakes and glass flakes, as well as layered inorganic compounds, stabilizers (such as antioxidants, thermal stabilizers and ultraviolet absorbers), plasticizers, antistatic agents, lubricants, blocking prevention agents, colorants, fillers and crystal nucleating agents. Specific examples of swellable inorganic layered compounds that may be used include hydrous silicates (such as phyllosilicate minerals), kaolinite-type clay minerals (such as halloysite, kaolinite, endellite, dickite and nacrite), antigorite-type clay minerals (such as antigorite and chrysotile), smectite-type clay minerals (such as montmorillonite, beidellite, nontronite, saponite, hectorite, sauconite and stevensite), vermiculite-type clay minerals (such as vermiculite), and mica and mica-type clay minerals (including micas such as muscovite and phlogopite, as well as margarite, tetrasililic mica and tenorite). These minerals may be either naturally-occurring clay minerals or synthetic clay minerals. These swellable inorganic layered compounds may be used individually, or two or more compounds may be used in combination.

Furthermore, a conventional acid anhydride may also be used in combination within the adhesive as a method of further improving the acid resistance of the adhesive layer. Examples of this acid anhydride include phthalic anhydride, succinic anhydride, Het anhydride, himic anhydride, maleic anhydride, tetrahydrophthalic anhydride, hexahydrophthalic anhydride, tetrabromophthalic anhydride, tetrachlorophthalic anhydride, trimellitic anhydride, pyromellitic anhydride, benzophenonetetracarboxylic anhydride, 2,3,6,7-naphthalentetracarboxylic dianhydride, 5-(2,5-oxotetrahydrofuryl)-3-methyl-3-cyclohexene-1,2-dicarboxylic anhydride, and styrene-maleic anhydride copolymers.

Further, compounds having an oxygen-trapping function or the like may also be added as required. Examples of compounds having an oxygen-trapping function include low-molecular weight organic compounds that react with oxygen such as hindered phenols, vitamin C, vitamin E, organophosphorus compounds, gallic acid and pyrogallol, and transition metal compounds of metals such as cobalt, manganese, nickel, iron and copper.

Furthermore, in order to improve the pressure-sensitive adhesiveness to various film materials immediately following application of the adhesive, pressure-sensitive adhesiveness-imparting agents such as xylene resins, terpene resins, phenol resins and rosin resins may be added as required. If these types of pressure-sensitive adhesiveness-imparting agents are added, the amount added is preferably within a range from 0.01 to 5 parts by mass per 100 parts by mass of the combined mass of the resin and the curing agent.

(Adhesive Form)

The adhesive of the present invention may be used in either a solvent-based form or a solventless form. In the case of a solvent-based form, the solvent may be used as the reaction medium during production of the amorphous polyester polyol and the curing agent. The solvent may also be used as a diluent during application of the adhesive. Examples of solvents that may be used include esters such as ethyl acetate, butyl acetate and cellosolve acetate, ketones such as acetone, methyl ethyl ketone, isobutyl ketone and cyclohexanone, ethers such as tetrahydrofuran and dioxane, aromatic hydrocarbons such as toluene and xylene, halogenated hydrocarbons such as methylene chloride and ethylene chloride, dimethylsulfoxide and dimethylsulfonamide. Among these solvents, the use of ethyl acetate or methyl ethyl ketone is usually preferred.

The adhesive of the present invention can be used by coating the adhesive onto a substrate film or the like. There are no particular limitations on the coating method, and conventional methods may be used. For example, in the case of a solvent-based form where the viscosity can be adjusted, the adhesive is often applied using a gravure roll coating method or the like. Further, in the case of a solventless form in which the viscosity at room temperature is too high to be suitable for gravure roll coating, the adhesive may be applied with heating using a roll coater or the like. When a roll coater is used, the adhesive of the present invention is preferably heated to a temperature within a range from room temperature to 120° C. to achieve a viscosity for the adhesive of 500 to 2,500 mPa·s prior to coating.

The adhesive of the present invention can be used as an oxygen-barrier adhesive on polymers, papers and metals and the like, for all manner of applications that require oxygen-barrier properties. Use of the adhesive as an adhesive for a film laminate is described below as an example of one specific potential application of the adhesive.

The adhesive of the present invention can be used as an adhesive for a film laminate. The laminated multilayer film exhibits excellent oxygen-barrier properties, and can therefore be used as an oxygen-barrier film.

There are no particular limitations on the films used for lamination in the present invention, and appropriate thermoplastic resin films may be selected in accordance with the intended application. Examples of foodstuff packaging films include PET films, polystyrene films, polyamide films, polyacrylonitrile films, polyolefin films such as polyethylene films (LLDPE: low density polyethylene films, HDPE: high density polyethylene films) and polypropylene films (CPP: unstretched polypropylene films, OPP: biaxially stretched polypropylene films), polyvinyl alcohol films, and ethylene-vinyl alcohol copolymer films. These films may be subjected to a stretching treatment. The stretching treatment generally involves extruding the melted resin in sheet form using an extrusion film formation method, and then performing simultaneous biaxial stretching or sequential biaxial stretching. In the case of sequential biaxial stretching, longitudinal stretching is usually performed first, with transverse stretching being performed thereafter. Specifically, a method that combines longitudinal stretching using a speed difference between rollers, and transverse stretching using a tenter is widely used.

Further, in order to ensure formation of an adhesive layer having no defects such as cracking or cissing within the film, the film surface may be subjected to any of various surface treatments such as a flame treatment or corona discharge treatment.

The adhesive of the present invention is coated onto one of the aforementioned thermoplastic resin films, and a second thermoplastic resin film is then overlaid thereon and bonded by lamination, thus obtaining an oxygen-barrier film of the present invention. Conventional lamination methods may be used for the lamination, including dry lamination, non-solvent lamination and extrusion lamination.

Specifically, in a dry lamination method, the adhesive of the present invention is applied to one substrate film using the gravure roll method, a second substrate film is then overlaid thereon, and the films are bonded together by dry lamination. The temperature of the lamination rollers is preferably within a range from room temperature to approximately 60° C.

Further, in a non-solvent lamination, the adhesive of the present invention is preheated to a temperature within a range from room temperature to approximately 120° C., and is subsequently applied to the substrate film using a roll coater or the like that has been heated to a temperature within a range from room temperature to approximately 120° C. A new film material is then immediately bonded to the adhesive surface to form a laminate film. The lamination pressure is preferably within a range from approximately 10 to 300 kg/cm².

In the case of an extrusion lamination method, an organic solvent solution of the adhesive of the present invention is applied to the substrate film as an adhesion assistant (anchor coating agent) using a roll such as a gravure roll, and following drying of the solvent and performing a curing reaction at a temperature within a range from room temperature to 140° C., an extruder is used to laminate the melted polymer materials together to obtain a laminate film. The polymer materials that undergo melting are preferably polyolefin resins such as low density polyethylene resins, linear low density polyethylene resins, or ethylene-vinyl chloride copolymer resins.

Further, the oxygen-barrier film of the present invention is preferably subjected to aging following formation. In those cases where a polyisocyanate is used as the curing agent, the aging conditions typically include a temperature within a range from room temperature to 80° C. and a period of 12 to 240 hours, and during this period, the amorphous polyester polyol and the crystalline polyester polyol react with the curing agent, generating adhesive strength.

In the present invention, in order to achieve even more superior barrier functionality, if required, a laminated film that includes a vapor-deposited layer of a metal such as aluminum or a metal oxide such as silica or alumina, or a barrier film containing a gas barrier layer composed of a polyvinyl alcohol, ethylene-vinyl alcohol copolymer or vinylidene chloride or the like may be used in combination with the adhesive of the present invention.

The adhesive of the present invention can be used favorably as an adhesive for laminated films obtained by bonding together a plurality of identical or different resin films. The resins films may be selected in accordance with the intended purpose, but when the laminated film is to be used as a packaging material, a composite film composed of two layers in which the outermost layer uses a thermoplastic resin film selected from among PET, OPP and polyamides, and the innermost layer uses a thermoplastic resin film selected from among unstretched polypropylene (hereafter abbreviated as CPP) and low density polyethylene film (hereafter abbreviated as LLDPE), or a composite film composed of three layers in which a thermoplastic resin film selected from among PET, polyamide and OPP is used for forming the outermost layer, a thermoplastic resin film selected from among OPP, PET and polyamide is used for forming the intermediate layer, and a thermoplastic resin film selected from among CPP and LLDPE is used for forming the innermost layer, or a composite film composed of four layers in which a thermoplastic resin film selected from among OPP, PET and polyamide is used for forming the outermost layer, a thermoplastic film selected from among PET and nylon is used for forming a first intermediate layer, a thermoplastic film selected from among PET and polyamide is used for forming a second intermediate layer, and a thermoplastic resin film selected from among LLDPE and CPP is used for forming the innermost layer, can be used particularly favorably as a foodstuff packaging material.

Because a feature of the adhesive of the present invention is its superior oxygen-barrier properties, a laminate film formed using the adhesive is able to exhibit an extremely high level of gas barrier properties even without using typical gas barrier materials such as PVDC coating layers, polyvinyl alcohol (PVA) coating layers, ethylene-vinyl alcohol copolymer (EVOH) film layers, meta-xylylene adipamide film layers, and inorganic deposition film layers formed by vapor deposition of alumina or silica or the like. Further, by using the adhesive of the present invention as the adhesive for bonding these conventional gas barrier materials and sealant materials, the gas barrier properties of the resulting laminate film can be dramatically improved.

EXAMPLES

A more detailed description of the present invention is presented below using a series of examples and comparative examples. In the examples, unless stated otherwise, the units "parts" and "%" refer to mass-referenced values.

(Production Example 1) Method of Producing an Amorphous Polyester Polyol EGoPA600 from Phthalic Anhydride and Ethylene Glycol A polyester reaction container fitted with a stirrer, a nitrogen gas inlet, a rectifying column and a water separator and the like was charged with 148.1 parts of phthalic anhydride, 84.2 parts of ethylene glycol and 0.03 parts of titanium tetraisopropoxide, and the mixture was heated gradually so that the temperature at the top of the rectifying column did not exceed 100° C., and the internal temperature was then held at 205° C. Once the acid value had fallen to 1 mgKOH/g or less, the esterification reaction was halted, yielding an amorphous polyester polyol with a number-average molecular weight of 600.

(Production Example 2) Method of Producing an Amorphous Polyester Polyol EGoPA600 from Ortho-Phthalic Acid and Ethylene Glycol A polyester reaction container fitted with a stirrer, a nitrogen gas inlet, a rectifying column and a water separator and the like was charged with 166.1 parts of ortho-phthalic acid, 84.3 parts of ethylene glycol and 0.03 parts of titanium tetraisopropoxide, and the mixture was heated gradually so that the temperature at the top of the rectifying column did not exceed 100° C., and the internal temperature was then held at 205° C. Once the acid value had fallen to 1 mgKOH/g or less, the esterification reaction was halted, yielding an amorphous polyester polyol with a number-average molecular weight of 600.

(Production Example 3) Method of Producing an Amorphous Polyester Polyol EGoPA3000 from Phthalic Anhydride and Ethylene Glycol A polyester reaction container fitted with a stirrer, a nitrogen gas inlet, a rectifying column and a water separator and the like was charged with 148.1 parts of phthalic anhydride, 66.1 parts of ethylene glycol and 0.03 parts of titanium tetraisopropoxide, and the mixture was heated gradually so that the temperature at the top of the rectifying column did not exceed 100° C., and the internal temperature was then held at 205° C. Once the acid value had fallen to 1 mgKOH/g or less, the esterification reaction was halted, yielding an amorphous polyester polyol with a number-average molecular weight of 3,000.

(Production Example 4) Method of Producing an Amorphous Polyester Polyol NPGoPA600 from Phthalic Anhydride and Neopentyl Glycol A polyester reaction container fitted with a stirrer, a nitrogen gas inlet, a rectifying column and a water separator and the like was charged with 148.1 parts of phthalic anhydride, 153.4 parts of neopentyl glycol and 0.03 parts of titanium tetraisopropoxide, and the mixture was heated gradually so that the temperature at the top of the rectifying column did not exceed 100° C., and the internal temperature was then held at 205° C. Once the acid value had fallen to 1 mgKOH/g or less, the esterification reaction was halted, yielding an amorphous polyester polyol with a number-average molecular weight of 600.

(Production Example 5) Method of Producing an Amorphous Polyester Polyol CHDMoPA600 from Phthalic Anhydride and 1,4-Cyclohexanedimethanol A polyester reaction container fitted with a stirrer, a nitrogen gas inlet, a rectifying column and a water separator and the like was charged with 148.1 parts of phthalic anhydride, 231.0 parts of 1,4-cyclohexanedimethanol and 0.03 parts of titanium tetraisopropoxide, and the mixture was heated gradually so that the temperature at the top of the rectifying column did not exceed 100° C., and the internal temperature was then held at 205° C. Once the acid value had fallen to 1 mgKOH/g or less, the esterification reaction was halted, yielding an amorphous polyester polyol with a number-average molecular weight of 600.

(Production Example 6) Method of Producing an Amorphous Polyester Polyol EGoPASuA600 from Phthalic Anhydride, Succinic Acid, and Ethylene Glycol A polyester reaction container fitted with a stirrer, a nitrogen gas inlet, a rectifying column and a water separator and the like was charged with 647.0 parts of phthalic anhydride, 277.8 parts of succinic acid, 575.2 parts of ethylene glycol and 0.12 parts of titanium tetraisopropoxide, and the mixture was heated gradually so that the temperature at the top of the rectifying column did not exceed 100° C., and the internal temperature was then held at 205° C. Once the acid value had fallen to 1 mgKOH/g or less, the esterification reaction was halted, yielding an amorphous polyester polyol with a number-average molecular weight of 600.

(Production Example 7) Method of Producing an Amorphous Polyester Polyol HGoPA600 from Phthalic Anhydride and 1,6-hexanediol A polyester reaction container fitted with a stirrer, a nitrogen gas inlet, a rectifying column and a water separator and the like was charged with 148.1 parts of phthalic anhydride, 179.1 parts of 1,6-hexanediol and 0.03 parts of titanium tetraisopropoxide, and the mixture was heated gradually so that the temperature at the top of the rectifying column did not exceed 100° C., and the internal temperature was then held at 205° C. Once the acid value had fallen to 1 mgKOH/g or less, the esterification reaction was halted, yielding an amorphous polyester polyol with a number-average molecular weight of 600.

(Production Example 8) Method of Producing a Crystalline Polyester Polyol EGtPA600 from Terephthalic Acid and Ethylene Glycol A polyester reaction container fitted with a stirrer, a nitrogen gas inlet, a rectifying column and a water separator and the like was charged with 166.1 parts of terephthalic acid, 84.2 parts of ethylene glycol and 0.03 parts of titanium tetraisopropoxide, and the mixture was heated gradually so that the temperature at the top of the rectifying column did not exceed 100° C., and the internal temperature was then held at 205° C. Once the acid value had fallen to 1 mgKOH/g or less, the esterification reaction was halted, yielding a crystalline polyester polyol with a number-average molecular weight of 600.

(Production Example 9) Method of Producing a Crystalline Polyester Polyol EGAA600 from Adipic Acid and Ethylene Glycol A polyester reaction container fitted with a stirrer, a nitrogen gas inlet, a rectifying column and a water separator and the like was charged with 146.2 parts of adipic acid, 81.9 parts of ethylene glycol and 0.03 parts of titanium tetraisopropoxide, and the mixture was heated gradually so that the temperature at the top of the rectifying column did not exceed 100° C., and the internal temperature was then held at 205° C. Once the acid value had fallen to 1 mgKOH/g or less, the esterification reaction was halted, yielding a crystalline polyester polyol with a number-average molecular weight of 600.

(Production Example 10) Method of Producing a Crystalline Polyester Polyol EGSuA600 from Succinic Acid and Ethylene Glycol A polyester reaction container fitted with a stirrer, a nitrogen gas inlet, a rectifying column and a water separator and the like was charged with 118.1 parts of succinic acid, 78.7 parts of ethylene glycol and 0.03 parts of titanium tetraisopropoxide, and the mixture was heated gradually so that the temperature at the top of the rectifying column did not exceed 100° C., and the internal temperature was then held at 205° C. Once the acid value had fallen to 1 mgKOH/g or less, the esterification reaction was halted, yielding a crystalline polyester polyol with a number-average molecular weight of 600.

(Production Example 11) Method of Producing an Amorphous Polyester Polyol EGNPGiPASbA from Isophthalic Acid, Sebacic Acid, Ethylene Glycol, and Neopentyl Glycol A polyester reaction container fitted with a stirrer, a nitrogen gas inlet, a rectifying column and a water separator and the like was charged with 16.3 parts of ethylene glycol, 27.3 parts of neopentyl glycol, 50.5 parts of isophthalic acid, 20.5 parts of sebacic acid, and 0.03 parts of titanium tetraisopropoxide, and the mixture was heated gradually so that the temperature at the top of the rectifying column did not exceed 100° C., and the internal temperature was then held at 205° C. Once the acid value had fallen to 1 mgKOH/g or less, the esterification reaction was halted, yielding an amorphous polyester polyol with a number-average molecular weight of 800.

For each of the amorphous polyester polyols obtained in the production examples 1 to 6, the raw material monomer composition, the number-average molecular weight of the resin, and the amount of the ortho-phthalic acid or anhydride thereof relative to the total mass of polyvalent carboxylic acid components (referred to as the "ortho-phthalic acid content" (% by mass)) are shown in Table 1.

For each of the amorphous polyester polyols and crystalline polyester polyols obtained in the production examples 7 to 11, the raw material monomer composition, the number-average molecular weight of the resin, and the amount of the ortho-phthalic acid or anhydride thereof relative to the total mass of polyvalent carboxylic acid components (referred to as the "ortho-phthalic acid content" (% by mass)) are shown in Table 2.

(Curing Agent a for Solvent-Based Adhesives)

A curing agent a was prepared by mixing TAKENATE D-110N (a trimethylolpropane adduct of meta-xylylene diisocyanate, manufactured by Mitsui Chemicals, Inc.) and TAKENATE 500 (a meta-xylylene diisocyanate non-volatile fraction, manufactured by Mitsui Chemicals, Inc.) in a ratio of 50/50 (mass ratio). The non-volatile fraction of the curing agent a was 87.5% and the NCO % was 28.1%.

(Curing Agent b for Solventless Adhesives)

A curing agent b was prepared by mixing DESMODUR N3200 (a biuret form of hexamethylene diisocyanate, manufactured by Sumitomo Bayer Urethane Co., Ltd.) and TAKENATE 500 (manufactured by Mitsui Chemicals, Inc.) in a ratio of 33/67 (mass ratio). The non-volatile fraction of the curing agent b was 99% or greater and the NCO % was 37.4%.

Examples 1 to 6, Comparative Examples 1 to 5: Method of Producing Solvent-Based Adhesives The amorphous and crystalline polyester polyols obtained in the production examples 1 to 11 described above were each diluted with methyl ethyl ketone to obtain a resin solution having a non-volatile fraction of 50%, and the curing agent a was then added in an amount shown in Table 3 or Table 4, thus obtaining a series of solvent-based adhesives for use in a coating method 1 described below.

Example 7, Comparative Example 6: Method of Producing Solventless Adhesives

The amorphous polyester polyol obtained in the production example 1 and the crystalline polyester polyol obtained in the production example 7 were each heated to 80° C., and the curing agent b was then added in an amount shown in Table 3 or Table 4, thus obtaining solventless adhesives for use in a coating method 2 described below.

(Coating Method 1)

The solvent-based adhesive described above was applied to a PET film of thickness 50 μm (E-5100, manufactured by Toyobo Co., Ltd.) using a bar coater in a coating amount of 5.0 g/m$^2$ (solid fraction), the diluent solvent was then dried by volatilization in a dryer set to a temperature of 70° C., and the adhesive surface of the PET film having the adhesive coated thereon was laminated to a CPP film of thickness 70 μm (ZK93KM, manufactured by Toray Industries, Inc.), thus forming a composite film having a layer structure of PET film/adhesive layer/CPP film. Subsequently, the composite film was aged at 40° C. for 3 days to cure the adhesive, thus obtaining an oxygen-barrier film of the present invention.

(Coating Method 2)

The solventless adhesive described above was heated to 80° C., and using a solventless test coater manufactured by Polytype SA as the roll coater, the solventless adhesive was applied to a PET film in a coating amount of 5.0 g/m$^2$. The coated surface was then laminated to a CPP film to produce a composite film having a layer structure of PET film/adhesive layer/CPP film. Subsequently, the composite film was aged at 40° C. for 3 days to cure the adhesive, thus obtaining an oxygen-barrier film of the present invention.

(Evaluation Methods)

(1) Laminate Strength

Following completion of aging, the oxygen-barrier film was cut into 15 mm strips in a direction parallel to the coating direction, and the laminate strength between the PET film and the CPP film was recorded as the tensile strength observed when a 180° peel test was performed using a Tensilon Universal Tester manufactured by Orientec Co., Ltd., under conditions including an atmospheric temperature of 25° C. and a peel speed of 300 mm/minute. The units for the laminate strength were N/15 mm.

(2) Oxygen Transmission Rate

Following completion of aging, the oxygen transmission rate of the oxygen-barrier film was measured in accordance with JIS-K7126 (equal pressure method) using an oxygen transmission measuring device OX-TRAN2/21MH manufactured by Mocon, Inc., under both an atmosphere at 23° C. and 0% RH, and an atmosphere at 23° C. and 90% RH. RH represents the relative humidity.

Reference Example 1

The results of measuring the oxygen transmission rate for a PET (biaxially stretched polyethylene terephthalate) film having a thickness of 50 μm (E-5100 manufactured by Toyobo Co., Ltd.) were recorded.

The results for each of the examples are shown in Table 3, and the results for each of the comparative examples and the reference example 1 are shown in Table 4.

TABLE 1

| | | Composition (parts) | | | | | |
|---|---|---|---|---|---|---|---|
| | | Production example 1 | Production example 2 | Production example 3 | Production example 4 | Production example 5 | Production example 6 |
| Number-average molecular weight | | 600 | 600 | 3000 | 600 | 600 | 600 |
| Acid component (parts) | phthalic anhydride | 148.1 | — | 148.1 | 148.1 | 148.1 | 647.0 |
| | ortho-phthalic acid | — | 166.1 | — | — | — | — |
| | isophthalic acid | — | — | — | — | — | — |
| | terephthalic acid | — | — | — | — | — | — |
| | succinic acid | — | — | — | — | — | 277.8 |
| | adipic acid | — | — | — | — | — | — |
| | sebacic acid | — | — | — | — | — | — |
| Diol component (parts) | ethylene glycol | 84.2 | 84.3 | 66.1 | — | — | 575.2 |
| | neopentyl glycol | — | — | — | 153.4 | — | — |
| | 1,4-cyclohexane dimethanol | — | — | — | — | 231.0 | — |
| | 1,6-hexanediol | — | — | — | — | — | — |
| ortho-phthalic acid content (% by mass) | | 100 | 100 | 100 | 100 | 100 | 70 |

TABLE 2

| | | Composition (parts) | | | | |
|---|---|---|---|---|---|---|
| | | Production example 7 | Production example 8 | Production example 9 | Production example 10 | Production example 11 |
| Number-average molecular weight | | 600 | 600 | 600 | 600 | 600 |
| Acid component (parts) | phthalic anhydride | 148.1 | — | — | — | — |
| | ortho-phthalic acid | — | — | — | — | — |
| | isophthalic acid | — | — | — | — | 50.5 |
| | terephthalic acid | — | 166.1 | — | — | — |
| | succinic acid | — | — | — | 118.1 | — |
| | adipic acid | — | — | 146.2 | — | — |
| | sebacic acid | — | — | — | — | 20.5 |
| Diol component (parts) | ethylene glycol | — | 84.2 | 81.9 | 78.7 | 16.3 |
| | neopentyl glycol | — | — | — | — | 27.3 |
| | 1,4-cyclohexane dimethanol | — | — | — | — | — |
| | 1,6-hexanediol | 179.1 | — | — | — | — |
| ortho-phthalic acid content (% by mass) | | 100 | 0 | 0 | 0 | 0 |

TABLE 3

| | Example 1 | Example 2 | Example 3 | Example 4 | Example 5 | Example 6 | Example 7 |
|---|---|---|---|---|---|---|---|
| Coating method | 1 | 1 | 1 | 1 | 1 | 1 | 2 |
| Methyl ethyl ketone (diluent solvent) | 50 | 50 | 50 | 50 | 50 | 50 | — |
| EGoPA600 | 50 | — | — | — | — | — | 100 |
| EGoPA600 | — | 50 | — | — | — | — | — |
| EGoPA3000 | — | — | 50 | — | — | — | — |
| NPGoPA600 | — | — | — | 50 | — | — | — |
| CHDMoPA600 | — | — | — | — | 50 | — | — |
| EGoPASuA600 | — | — | — | — | — | 50 | — |
| Curing agent a (parts) | 25 | 25 | 5 | 25 | 25 | 25 | — |
| Curing agent b (parts) | — | — | — | — | — | — | 38 |
| Laminate strength (N/15 mm) | 13.5 | 13.3 | 13.5 | 12.9 | 13.1 | 12.8 | 12.9 |

TABLE 3-continued

|  | Example 1 | Example 2 | Example 3 | Example 4 | Example 5 | Example 6 | Example 7 |
|---|---|---|---|---|---|---|---|
| Oxygen transmission rate (23° C., 0% RH) (cc/m² · day · atm) | 10.5 | 10.6 | 13.6 | 18.7 | 13.8 | 11.6 | 11.1 |
| Oxygen transmission rate (23° C., 90% RH) (cc/m² · day · atm) | 10.4 | 10.2 | 14.0 | 14.5 | 13.9 | 11.5 | 10.7 |

TABLE 4

|  | Comparative example 1 | Comparative example 2 | Comparative example 3 | Comparative example 4 | Comparative example 5 | Comparative example 6 | Reference example 1 PET 50 μm |
|---|---|---|---|---|---|---|---|
| Coating method | 1 | 1 | 1 | 1 | 1 | 2 | — |
| Methyl ethyl ketone (diluent solvent) | 50 | 50 | 50 | 50 | 50 | — | — |
| HGoPA600 | 50 | — | — | — | — | — | — |
| EGtPA600 | — | did not dissolve | — | — | — | 100 | — |
| EGAA600 | — | — | 50 | — | — | — | — |
| EGSuA600 | — | — | — | did not dissolve | — | — | — |
| EGNPGiPASbA | — | — | — | — | 50 | — | — |
| Curing agent a (parts) | 25 | addition impossible | 25 | addition impossible | 17 | — | — |
| Curing agent b (parts) | — | — | — | — | — | addition impossible | — |
| Laminate strength (N/15 mm) | 13.5 | not measurable | 13.5 | not measurable | 13.0 | not measurable | — |
| Oxygen transmission rate (23° C., 0% RH) (cc/m² · day · atm) | 24.0 | not measurable | 27.1 | not measurable | 29.3 | not measurable | 31.0 |
| Oxygen transmission rate (23° C., 90% RH) (cc/m² · day · atm) | 17.6 | not measurable | 19.1 | not measurable | 20.5 | not measurable | 21.3 |

These results revealed that the oxygen-barrier films that used the adhesives of the examples 1 to 7 all exhibited an oxygen transmission rate at 0% RH of 19 cc/m²·day·atm or less, an oxygen transmission rate at 90% RH of 15 cc/m²·day·atm or less, and excellent laminate strength. In particular, the oxygen-barrier properties under high humidity conditions of 90% RH were even superior to those observed under low humidity conditions. In contrast, the comparative example 1 represents an example in which 1,6-hexanediol was used as the diol component, but the oxygen transmission rate was high. Further, in the adhesives of the comparative examples 2 and 4, the crystalline polyester polyols that were used exhibited poor solubility and could not be dissolved in the MEK, and therefore addition of the curing agent and subsequent coating were impossible. Furthermore, in the adhesive of the comparative example 6, the crystalline polyester polyol that was used could not be softened even when heated to 80° C., and therefore addition of the curing agent and subsequent coating using the coating method 2 were impossible.

The comparative example 3 used adipic acid as the polyvalent carboxylic acid, and the comparative example 5 used isophthalic acid and sebacic acid as the polyvalent carboxylic acids, but both of these comparative examples exhibited high oxygen transmission rates.

Examples of the production of polyester polyols containing an isocyanuric ring are described below in production examples 12 to 17.

(Production Example 12) Method of Producing an Amorphous Polyester Polyol THEI(oPAEG)1 from tris(2-hydroxyethyl)isocyanurate, Ortho-Phthalic Acid and Ethylene Glycol A polyester reaction container fitted with a stirrer, a nitrogen gas inlet, a Snyder column and a condenser was charged with 261.23 parts of tris(2-hydroxyethyl) isocyanurate, 148.1 parts of phthalic anhydride, 64.57 parts of ethylene glycol and 0.03 parts of titanium tetraisopropoxide, and the mixture was heated gradually so that the temperature at the top of the rectifying column did not exceed 100° C., and the internal temperature was then held at 220° C. Once the acid value had fallen to 1 mgKOH/g or less, the esterification reaction was halted, yielding an amorphous polyester polyol THEI(oPAEG)1 with a number-average molecular weight of 453. The mass % of the isocyanuric ring within this amorphous polyester polyol was 27.83%.

(Production Example 13) Method of Producing an Amorphous Polyester Polyol THEI(oPAEG)2 from tris(2-hydroxyethyl)isocyanurate, Ortho-Phthalic Acid and Ethylene Glycol With the exceptions of altering the amount of phthalic anhydride from 148.1 parts to 296.2 parts, and altering the amount of ethylene glycol from 64.57 parts to 129.10 parts, an amorphous polyester polyol THEI(oPAEG)2 with a number-average molecular weight of 645 was obtained in the same manner as the production example 12. The mass % of the isocyanuric ring within this amorphous polyester polyol was 19.53%.

(Production Example 14) Method of Producing an Amorphous Polyester Polyol THEI(oPAEG)3 from tris(2-hydroxyethyl)isocyanurate, Ortho-Phthalic Acid and Ethylene Glycol With the exceptions of altering the amount of phthalic anhydride from 148.1 parts to 444.36 parts, and altering the amount of ethylene glycol from 64.57 parts to 193.60 parts, an amorphous polyester polyol THEI(oPAEG)3 with a number-average molecular weight of 837 was obtained in the same manner as the production example 12. The mass % of the isocyanuric ring within this amorphous polyester polyol was 15.06%.

(Production Example 15) Method of Producing an Amorphous Polyester Polyol THEI(oPAEG)6 from tris(2-hydroxyethyl)isocyanurate, Ortho-Phthalic Acid and Ethylene Glycol With the exceptions of altering the amount of phthalic anhydride from 148.1 parts to 888.72 parts, and altering the amount of ethylene glycol from 64.57 parts to 387.32 parts, an amorphous polyester polyol THEI(oPAEG)6 with a number-average molecular weight of 837 was obtained in the same manner as the production example 12. The mass % of the isocyanuric ring within this amorphous polyester polyol was 8.91%.

(Production Example 16) Method of Producing an Amorphous Polyester Polyol THPI(oPAEG)3 from tris(2-hydroxypropyl)isocyanurate, Ortho-Phthalic Acid and Ethylene Glycol With the exception of replacing the tris(2-hydroxyethyl)isocyanurate from the production example 14 with 303.31 parts of tris(2-hydroxypropyl)isocyanurate, an amorphous polyester polyol THPI(oPAEG)3 with a number-average molecular weight of 879.8 was obtained in the same manner as the production example 14. The mass % of the isocyanuric ring within this amorphous polyester polyol was 14.33%.

(Production Example 17) Method of Producing an Amorphous Polyester Polyol THPI(oNAEG)3 from tris(2-hydroxyethyl)isocyanurate, naphthalene-2,3-dicarboxylic Acid and Ethylene Glycol With the exception of replacing the ortho-phthalic anhydride from the production example 14 with 594.51 parts of naphthalene-2,3-dicarboxylic acid, an amorphous polyester polyol THPI(oNAEG)3 with a number-average molecular weight of 987.9 was obtained in the same manner as the production example 14. The mass % of the isocyanuric ring within this amorphous polyester polyol was 12.76%.

(Production Example 18) Method of Producing an Amorphous Polyester Polyol TMP(oPAEG)6 from Trimethylolpropane, Ortho-Phthalic Anhydride and Ethylene Glycol With the exception of replacing the tris(2-hydroxyethyl)isocyanurate from the production example 15 with 134.17 parts of trimethylolpropane, an amorphous polyester polyol TMP(oPAEG)6 with a number-average molecular weight of 710 was obtained in the same manner as the production example 15. The mass % of the isocyanuric ring within this amorphous polyester polyol was 0.0%.

(Production Example 19) Method of Producing an Amorphous Polyester Polyol GLY(oPAEG)6 from Glycerol, Ortho-Phthalic Anhydride and Ethylene Glycol With the exception of replacing the tris(2-hydroxyethyl)isocyanurate from the production example 15 with 92.09 parts of glycerol, an amorphous polyester polyol GLY(oPAEG)6 with a number-average molecular weight of 669 was obtained in the same manner as the production example 15. The mass % of the isocyanuric ring within this amorphous polyester polyol was 0.0%.

(Production Example 20) Method of Producing mXDI Adduct of Glycerol

A reaction container fitted with a stirrer, a nitrogen gas inlet, a cooling condenser, a dropping funnel and a water separator and the like was charged with 444.20 parts of xylylene diisocyanate (mXDI), which was then heated to 70° C. under stirring. Subsequently, 85.8 parts of glycerol was added dropwise over one hour. Following completion of the dropwise addition, stirring was continued for 3 hours at 70° C., 114 parts of methyl ethyl ketone in which the water content had been adjusted in advance to 1,000 ppm was then added and stirred, and following gradual cooling to room temperature, the gel that floated on a 100-mesh brass wire gauze was separated, yielding an mXDI adduct of glycerol. The non-volatile fraction of the glycerol mXDI adduct solution determined in accordance with JIS-K-6910 was 70.0%, and the NCO % determined in accordance with JIS-K1603 was 10.8%.

(Production Example 21) Method of producing mXDI adduct of 1,3-bis{bis-[2-hydroxyethyl]aminomethyl}benzene Production of 1,3-bis{bis-[2-hydroxyethyl]aminomethyl}benzene:

A reaction container fitted with a reflux condenser and a dropping funnel was charged with 105 g of diethanolamine, 69.1 g of potassium carbonate and 2 L of anhydrous ethanol, and the mixture was refluxed. Subsequently, using the dropping funnel, 131.98 g of 1,3-bis(bromomethyl)benzene was added gradually to the reaction container over a period of two hours, and reflux was then continued for a further 48 hours. The produced potassium bromide was removed using a glass filter, and the ethanol used in the reaction was removed by distillation under reduced pressure, yielding 1,3-bis{bis-[2-hydroxyethyl]aminomethyl}benzene.

Next, a reaction container fitted with a stirrer, a nitrogen gas inlet, a cooling condenser and a dropping funnel was charged with 790.36 parts of xylylene diisocyanate, which was then heated to 70° C. under stirring. Subsequently, 312.40 parts of the aforementioned 1,3-bis{bis-[2-hydroxyethyl]aminomethyl}benzene was added dropwise over one hour. Following completion of the dropwise addition, stirring was continued for 3 hours at 70° C., 473 parts of MEK that had been dewatered in advance to a water content of 1,000 ppm was then added and stirred, and following gradual cooling to room temperature, the gel that floated on a 100-mesh brass wire gauze was separated, yielding an mXDI adduct of a compound in which 4 mols of ethylene oxide had been added to meta-xylenediamine. The non-volatile fraction of the adduct solution determined in accordance with JIS-K-6910 was 70.0%, and the NCO % determined in accordance with JIS-K1603 was 9.6%.

(Curing Agent a for Solvent-Based Adhesives)

The same curing agent a as that used in the aforementioned examples 1 to 6 and the comparative examples 1 to 5 was used.

(Curing Agent c for Solvent-Based Adhesives)

A curing agent c was prepared by mixing the solution of the mXDI adduct of glycerol synthesized in the production example 20 (non-volatile fraction: 70%, NCO %: 10.8%) and TAKENATE 500 (meta-xylene diisocyanate non-volatile fraction: >99%, NCO %: 44.6%, manufactured by Mitsui Chemicals, Inc.) in a ratio of 50/50 (mass ratio). The non-volatile fraction of the curing agent c was 85% and the NCO % was 27.7%.

(Curing Agent d for Solvent-Based Adhesives)

The adduct of 1,3-bis{bis-[2-hydroxyethyl]aminomethyl}benzene and mXDI synthesized in the production example 21 (non-volatile fraction: 70%, NCO %: 9.6%) was used as a curing agent d.

(Curing Agent e for Solvent-Based Adhesives)

TAKENATE D-110N (a trimethylolpropane adduct of meta-xylylene diisocyanate, manufactured by Mitsui Chemicals, Inc., non-volatile fraction: 75.0%, NCO %: 11.5%) was used as a curing agent e.

(Curing Agent f for Solventless Adhesives)

TAKENATE 500 (meta-xylylene diisocyanate non-volatile fraction: >99%, NCO %: 44.6%, manufactured by Mitsui Chemicals, Inc.) was used as a curing agent f.

Examples 8 to 16, Comparative Examples 7 to 9: Method of Producing Solvent-Based Adhesives The amorphous polyester polyols obtained in the production examples described above were each diluted with methyl ethyl ketone to obtain a resin solution having a non-volatile fraction of 50%, and the curing agent a, c, d or e was then added in an amount shown in Table 5, Table 6 or table 7, thus obtaining a series of solvent-based adhesives which, with the exception of altering the thickness of the PET film to 12 μm (E-5100, manufactured by Toyobo Co., Ltd.), were used in the coating method 1 described above.

Example 17, Comparative Example 10: Method of Producing Solventless Adhesives

The amorphous polyester polyols THEI(oPAEG)3 and TMP(oPAEG)6 obtained in the production examples described above were each heated to 80° C., and the curing agent f was then added in an amount shown in Table 6 or table 7, thus obtaining solventless adhesives which, with the exception of altering the thickness of the PET film to 12 μm, were used in the coating method 2 described above.

(Evaluation Methods)

Evaluations of (1) the laminate strength, and (2) the oxygen transmission rate were performed in the same manner as that described for the examples 1 to 7 and the comparative examples 1 to 6.

Reference Example 2

The results of measuring the oxygen transmission rate for a stand-alone PET (biaxially stretched polyethylene terephthalate) film having a thickness of 12 μm (E-5100 manufactured by Toyobo Co., Ltd.) were recorded.

The results for each of the above examples are shown in Tables 5 and 6, and the results for each of the comparative examples and the reference example 2 are shown in Table 7.

TABLE 5

|  | Example 8 | Example 9 | Example 10 | Example 11 | Example 12 |
|---|---|---|---|---|---|
| Coating method | 1 | 1 | 1 | 1 | 1 |
| THEI(oPAEG)1 | 100 | — | — | — | — |
| THEI(oPAEG)2 | — | 100 | — | — | — |
| THEI(oPAEG)3 | — | — | 100 | — | — |
| THEI(oPAEG)6 | — | — | — | 100 | — |
| THPI(oPAEG)3 | — | — | — | — | 100 |
| THEI(oNAEG)3 | — | — | — | — | — |
| Curing agent a | 99.04 | 69.57 | 53.56 | 31.72 | 51.01 |
| Curing agent c | — | — | — | — | — |
| Curing agent d | — | — | — | — | — |
| Curing agent e | — | — | — | — | — |
| Curing agent f | — | — | — | — | — |
| MEK (diluent solvent) | 100 | 100 | 100 | 100 | 100 |
| Composition total mass (parts) | 299.04 | 269.57 | 253.56 | 231.72 | 251.01 |
| Volatile fraction mass (parts) | 112.38 | 108.70 | 106.70 | 103.96 | 106.38 |
| Resin solid fraction mass (parts) | 186.66 | 160.87 | 146.87 | 127.75 | 144.64 |
| Isocyanuric ring content % | 14.91 | 12.14 | 10.25 | 6.98 | 9.91 |
| Evaluation results | | | | | |
| Oxygen transmission rate (cc/m$^2$ · day · atm) (0% RH) | 14 | 18 | 23 | 35 | 25 |
| Oxygen transmission rate (cc/m$^2$ · day · atm) (90% RH) | 9 | 12 | 15 | 25 | 18 |
| Laminate strength (N/15 mm) | 2.5 | 7.0 | 10.0 | 7.0 | 10.0 |

TABLE 6

|  | Example 13 | Example 14 | Example 15 | Example 16 | Example 17 |
|---|---|---|---|---|---|
| Coating method | 1 | 1 | 1 | 1 | 2 |
| THEI(oPAEG)1 | — | — | — | — | — |
| THEI(oPAEG)2 | — | — | — | — | — |
| THEI(oPAEG)3 | — | 100 | 100 | 100 | 100 |
| THEI(oPAEG)6 | — | — | — | — | — |
| THPI(oPAEG)3 | — | — | — | — | — |
| THEI(oNAEG)3 | 100 | — | — | — | — |
| Curing agent a | 45.43 | — | — | — | — |
| Curing agent c | — | 54.25 | — | — | — |
| Curing agent d | — | — | — | — | — |
| Curing agent e | — | — | 109.70 | 64.94 | — |
| Curing agent f | — | — | — | — | 33.72 |
| MEK (diluent solvent) | 100 | 100 | 100 | 100 | 0 |
| Composition total mass (parts) | 245.43 | 254.25 | 309.7 | 264.94 | 133.72 |
| Volatile fraction mass (parts) | 105.68 | 108.14 | 132.91 | 119.48 | 0.00 |
| Resin solid fraction mass (parts) | 139.75 | 146.11 | 176.79 | 145.46 | 133.72 |
| Isocyanuric ring content % | 9.13 | 10.31 | 8.52 | 6.13 | 11.26 |
| Evaluation results | | | | | |
| Oxygen transmission rate (cc/m$^2$ · day · atm) (0% RH) | 11 | 12 | 22 | 35 | 23 |
| Oxygen transmission rate (cc/m$^2$ · day · atm) (90% RH) | 7 | 8 | 15 | 25 | 20 |
| Laminate strength (N/15 mm) | 5.0 | 7.0 | 10.0 | 5.0 | 10.0 |

TABLE 7

|  | Comparative example 7 | Comparative example 8 | Comparative example 9 | Comparative example 10 | Reference example 2 PET 12 μm |
|---|---|---|---|---|---|
| Coating method | 1 | 1 | 1 | 2 | — |
| TMP(oPAEG)6 | 100 | — | 100 | 100 | — |
| GLY(oPAEG)6 | — | 100 | — | — | — |
| Curing agent a | 34.87 | 36.05 | — | — | — |
| Curing agent c | — | — | — | — | — |
| Curing agent d | — | — | 85.06 | — | — |
| Curing agent e | — | — | — | — | — |
| Curing agent f | — | — | — | 21.92 | — |
| MEK (diluent solvent) | 100 | 100 | 100 | 0 | — |
| Composition total mass (parts) | 234.87 | 235.05 | 285.06 | 121.92 | — |
| Volatile fraction mass (parts) | 104.36 | 104.51 | 100.00 | 0 | — |
| Resin solid fraction mass (parts) | 130.51 | 131.54 | 185.06 | 121.92 | — |
| Isocyanuric ring content % | 0.00 | 0.00 | 0.00 | 0.00 | — |
| Evaluation results | | | | | |
| Oxygen transmission rate (cc/m$^2$ · day · atm) (0% RH) | 45 | 43 | 45 | 45 | 130 |
| Oxygen transmission rate (cc/m$^2$ · day · atm) (90% RH) | 38 | 35 | 38 | 40 | 100 |
| Laminate strength (N/15 mm) | 1.5 | 1.5 | <1 | 5.0 | — |

These results revealed that the oxygen-barrier films that used the adhesives of the examples 8 to 17 all exhibited low oxygen transmission rates, within a range from 11 to 35 cc/m$^2$·day·atm at 0% RH and within a range from 7 to 25 cc/m$^2$·day·atm at 90% RH, as well as excellent laminate strength. Further, in these examples, in a similar manner to that observed above, the oxygen-barrier properties under high humidity conditions of 90% RH were even superior to those observed under low humidity conditions. In contrast, the oxygen transmission rates of the oxygen-barrier films that used the adhesives of the comparative examples 7 to 10 were within a range from 43 to 45 cc/m$^2$·day·atm at 0% RH and within a range from 35 to 40 cc/m$^2$·day·atm at 90% RH, and the laminate strength of these oxygen-barrier films was also markedly lower.

Examples 18 to 27 present data that show a further enhancement in the oxygen-barrier properties by adding a fixed amount of a crystalline polyester polyol synthesized in production examples 22 to 25 to the amorphous polyester polyol.

(Production Example 22) Method of Producing a Crystalline Polyester Polyol EGSuA1000 from Succinic Acid and Ethylene Glycol With the exceptions of replacing the phthalic anhydride used in the production example 1 with 118.1 parts of succinic acid, and altering the amount of ethylene glycol from 84.2 parts to 71.6 parts, a crystalline polyester polyol with a number-average molecular weight of 1,000 was obtained in the same manner as the production example 1.

Confirmation of whether or not the product was crystalline was performed in the manner described below.

Using a differential scanning calorimeter "Diamond DSC" manufactured by PerkinElmer Japan Co., Ltd., measurement was performed under conditions including a temperature range of 20° C. to 200° C. and a rate of temperature increase of 20° C./minute. Under these conditions, a heat absorption peak was observed at 91° C., and the endothermic energy at this point was 74.8 J/g.

(Production Example 23) Method of Producing a Crystalline Polyester Polyol EGSuA3000 from Succinic Acid and Ethylene Glycol With the exception of altering the amount of ethylene glycol from 71.6 parts to 65.1 parts, a crystalline polyester polyol with a number-average molecular weight of 3,000 was obtained in the same manner as the production example 22.

(Production Example 24) Method of Producing a Crystalline Polyester Polyol EGtPA1000 from Terephthalic Acid and Ethylene Glycol With the exceptions of replacing the phthalic anhydride used in the production example 1 with 166.1 parts of terephthalic acid, and altering the amount of ethylene glycol from 84.2 parts to 74.8 parts, a crystalline polyester polyol with a number-average molecular weight of 1,000 was obtained in the same manner as the production example 1.

(Production Example 25) Method of Producing a Crystalline Polyester Polyol EGiPA600 from Isophthalic Acid and Ethylene Glycol With the exception of replacing the phthalic anhydride used in the production example 1 with 166.1 parts of isophthalic acid, a crystalline polyester polyol with a number-average molecular weight of 600 was obtained in the same manner as the production example 1.

(Method of Producing Mixtures of an Amorphous Polyester Polyol and a Crystalline Polyester Polyol Using a Melt Mixing Method)

Mixtures of the amorphous polyester polyols and crystalline polyesters produced using the production methods described above were prepared by a melt mixing method, by combining the amorphous polyester polyol and the crystalline polyester, and then heating to 100° C. and stirring for two hours. The amorphous polyester polyol component, the crystalline polyester component, and the composition ratio for each of the obtained melt mixtures are shown in Table 8 to Table 11.

(Method of Producing Mixtures of an Amorphous Polyester Polyol and a Crystalline Polyester Polyol Using a Physical Mixing Method)

A crystalline polyester obtained using one of the production methods described above was crushed in a mortar, methyl ethyl ketone was added, and the mixture was stirred vigorously using a TK Homogenizer (manufactured by Primix Corporation), thus yielding a crystalline polyester slurry having a non-volatile fraction of 50%. Subsequently, an amorphous polyester polyol obtained using one of the production methods described above was mixed with the crystalline polyester slurry, and the mixture was stirred using a TK Homogenizer, thus obtaining a mixture of the amorphous polyester polyol and the crystalline polyester formed by a physical mixing method. The amorphous polyester polyol component, the crystalline polyester component, and the composition ratio for each of the obtained physical mixtures are shown in Table 8 to Table 11.

(Curing Agent a for Solvent-Based Adhesive)

The same curing agent a as that used in the above examples 1 to 6 and the comparative examples 1 to 5 was used.

(Curing Agent b for Solventless Based Adhesive)

The same curing agent b as that used in the above example 7 and the comparative example 6 was used.

(Method of Producing Solvent-Based Adhesives)

The mixtures of an amorphous polyester polyol and a crystalline polyester obtained using the melt mixing method and physical mixing method described above were each diluted with methyl ethyl ketone to obtain a mixed solution having a non-volatile fraction of 50%, and the curing agent a was then added in an amount shown in Table 8 to Table 11, thus obtaining a series of solvent-based adhesives which, with the exception of altering the thickness of the PET film to 12 μm, were used in the coating method 1 described above.

(Method of Producing Solventless Adhesives)

The mixtures of an amorphous polyester polyol and a crystalline polyester obtained using the melt mixing method described above were each heated to 100° C., and the curing agent b was then added in an amount shown in Table 8 to Table 11, thus obtaining solventless adhesives which, with the exception of altering the thickness of the PET film to 12 μm, were used in the coating method 2 described above.

(Evaluation Methods)

Evaluations of (1) the laminate strength, and (2) the oxygen transmission rate were performed in the same manner as that described for the examples and the comparative examples 1 to 7.

The results for the examples 18 to 27 are shown in Tables 8 and 9, the results for comparative examples 11 to 15 are shown in Table 10, and the results for reference examples 3 to 8 are shown in Table 11.

TABLE 8

|  |  | Example 18 | Example 19 | Example 20 | Example 21 | Example 22 |
|---|---|---|---|---|---|---|
| Mixing method |  | melt mixing | melt mixing | physical mixing | melt mixing | melt mixing |
| Coating method |  | 1 | 1 | 1 | 1 | 1 |
| Methyl ethyl ketone (diluent solvent) |  | 50 | 50 | 50 | 50 | 50 |
| Amorphous | EGoPA600 | 45 | 40 | 40 | 33.5 | — |
|  | EGoPA3000 | — | — | — | — | 40 |
|  | NPGoPA600 | — | — | — | — | — |
|  | CHDMoPA600 | — | — | — | — | — |
|  | THEI(oPAEG)3 | — | — | — | — | — |
|  | EGNPGiPASbA | — | — | — | — | — |
| Crystalline | EGSuA1000 | 5 | 10 | 10 | 16.5 | — |
|  | EGSuA3000 | — | — | — | — | 10 |
|  | EGtPA1000 | — | — | — | — | — |
|  | EGiPA600 | — | — | — | — | — |

TABLE 8-continued

|  | Example 18 | Example 19 | Example 20 | Example 21 | Example 22 |
|---|---|---|---|---|---|
| Ratio of amorpous polyester polyol/crystalline polyester polyol | 90/10 | 80/20 | 80/20 | 67/33 | 80/20 |
| Curing agent a | 24 | 23 | 23 | 23 | 5 |
| Curing agent b | — | — | — | — | — |
| Oxygen transmission rate (cc/m$^2$ · day · atm) (0% RH) | 18 | 14 | 15 | 12 | 18 |
| Oxygen transmission rate (cc/m$^2$ · day · atm) (90% RH) | 33 | 30 | 29 | 25 | 35 |
| Laminate strength (N/15 mm) | 11 | 10 | 10 | 7 | 8 |

TABLE 9

|  |  | Example 23 | Example 24 | Example 25 | Example 26 | Example 27 |
|---|---|---|---|---|---|---|
| Mixing method | | physical mixing | melt mixing | melt mixing | melt mixing | melt mixing |
| Coating method | | 1 | 1 | 1 | 1 | 1 |
| Methyl ethyl ketone (diluent solvent) | | 50 | 50 | 50 | 50 | — |
| Amorphous | EGoPA600 | — | — | — | — | 40 |
|  | EGoPA3000 | — | — | — | — | — |
|  | NPGoPA600 | 40 | — | — | — | — |
|  | CHDMoPA600 | — | 40 | — | — | — |
|  | THEI(oPAEG)3 | — | — | 40 | 33.5 | — |
|  | EGNPGiPASbA | — | — | — | — | — |
| Crystalline | EGSuA1000 | — | — | 10 | 16.5 | 10 |
|  | EGSuA3000 | — | — | — | — | — |
|  | EGtPA1000 | 10 | — | — | — | — |
|  | EGiPA600 | — | 10 | — | — | — |
| Ratio of amorpous polyester polyol/crystalline polyester polyol | | 80/20 | 80/20 | 80/20 | 67/33 | 80/20 |
| Curing agent a | | 23 | 25 | 25 | 24 | — |
| Curing agent b | | — | — | — | — | 18 |
| Oxygen transmission rate (cc/m$^2$ · day · atm) (0% RH) | | 19 | 19 | 12 | 11 | 15 |
| Oxygen transmission rate (cc/m$^2$ · day · atm) (90% RH) | | 38 | 37 | 14 | 13 | 31 |
| Laminate strength (N/15 mm) | | 11 | 12 | 10 | 10 | 10 |

TABLE 10

|  |  | Comparative example 11 | Comparative example 12 | Comparative example 13 | Comparative example 14 | Comparative example 15 |
|---|---|---|---|---|---|---|
| Mixing method | | melt mixing | physical mixing | — | — | — |
| Coating method | | 1 | 1 | 1 | 1 | 2 |
| Methyl ethyl ketone (diluent solvent) | | 50 | 50 | 50 | 50 | — |
| Amorphous | EGoPA600 | — | — | — | — | — |
|  | EGoPA3000 | — | — | — | — | — |
|  | NPGoPA600 | — | — | — | — | — |
|  | CHDMoPA600 | — | — | — | — | — |
|  | THEI(oPAEG)3 | — | — | — | — | — |
|  | EGNPGiPASbA | 40 | 40 | — | — | 40 |
| Crystalline | EGSuA1000 | 10 | 10 | did not dissolve | — | 10 |
|  | EGSuA3000 | — | — | — | — | — |
|  | EGtPA1000 | — | — | — | did not dissolve | — |
|  | EGiPA600 | — | — | — | — | — |
| Ratio of amorpous polyester polyol/crystalline polyester polyol | | 80/20 | 80/20 | — | — | 80/20 |
| Curing agent a | | 18 | 18 | addition impossible | addition impossible | — |
| Curing agent b | | — | — | — | — | 14 |
| Oxygen transmission rate (cc/m$^2$ · day · atm) (0% RH) | | 125 | 127 | not measurable | not measurable | 131 |

TABLE 10-continued

|  | Comparative example 11 | Comparative example 12 | Comparative example 13 | Comparative example 14 | Comparative example 15 |
|---|---|---|---|---|---|
| Oxygen transmission rate (cc/m$^2$ · day · atm) (90% RH) | 100 | 98 | not measurable | not measurable | 96 |
| Laminate strength (N/15 mm) | 11 | 13 | not measurable | not measurable | 10 |

TABLE 11

|  |  | Reference example 3 | Reference example 4 | Reference example 5 | Reference example 6 | Reference example 7 | Reference example 8 |
|---|---|---|---|---|---|---|---|
| Mixing method |  | — | — | — | — | — | — |
| Coating method |  | 1 | 1 | 1 | 1 | 1 | 2 |
| Methyl ethyl ketone (diluent solvent) |  | 50 | 50 | 50 | 50 | 50 |  |
| Amorphous | EGoPA600 | 50 | — | — | — | — | 50 |
|  | EGoPA3000 | — | 50 | — | — | — | — |
|  | NPGoPA600 | — | — | 50 | — | — | — |
|  | CHDMoPA600 | — | — | — | 50 | — | — |
|  | THEI(oPAEG)3 | — | — | — | — | 50 | — |
|  | EGNPGiPASbA | — | — | — | — | — | — |
| Crystalline | EGSuA1000 | — | — | — | — | — | — |
|  | EGSuA3000 | — | — | — | — | — | — |
|  | EGtPA1000 | — | — | — | — | — | — |
|  | EGiPA600 | — | — | — | — | — | — |
| Amorpous polyester polyol/crystalline polyester polyol |  | 100/0 | 100/0 | 100/0 | 100/0 | 100/0 | 100/0 |
| Curing agent a |  | 25 | 5 | 25 | 25 | 28 | — |
| Curing agent b |  | — | — | — | — | — | 19 |
| Oxygen transmission rate (cc/m$^2$ · day · atm) (0% RH) |  | 35 | 52 | 60 | 59 | 23 | 35 |
| Oxygen transmission rate (cc/m$^2$ · day · atm) (90% RH) |  | 45 | 50 | 58 | 55 | 15 | 45 |
| Laminate strength (N/15 mm) |  | 12 | 11 | 12 | 10 | 10 | 11 |

These results revealed that the oxygen-barrier films that used the adhesives of the examples 18 to 27 exhibited extremely favorable oxygen-barrier properties, having oxygen transmission rates within a range from 11 to 19 cc/m$^2$·day·atm at 0% RH and within a range from 13 to 38 cc/m$^2$·day·atm at 90% RH, as well as displaying good laminate strength.

These results represent superior oxygen-barrier properties to those observed in the reference examples 1 to 6, in which an amorphous polyester polyol having barrier properties was used alone. In particular, the amorphous polyester polyol having an isocyanuric ring used in the examples 25 and 26 yielded the lowest oxygen transmission rate at 90% RH, thus exhibiting particularly superior oxygen-barrier properties under conditions of high humidity. Further, no significant differences were observed for the different mixing methods for the crystalline polyester and the amorphous polyester polyol.

In contrast, the comparative examples 11, 12 and 15 represent examples that used amorphous polyester polyols prepared without using a polyvalent carboxylic acid containing at least one type of ortho-phthalic acid or anhydride thereof, and even when 20% by mass of a crystalline polyester was added to the combined polyester, the oxygen transmission rate remained high.

Further, the comparative examples 13 and 14 represent examples that used only a crystalline polyester with no amorphous polyester polyol, but the crystalline polyesters exhibited poor solubility and could not be dissolved in the MEK, and therefore addition of the curing agent and subsequent coating were impossible.

INDUSTRIAL APPLICABILITY

The adhesive of the present invention has oxygen-barrier properties, and therefore in addition to its above-mentioned use as an adhesive for film laminates used for packaging materials, the adhesive can also be used favorably in any application that requires oxygen-barrier properties, including as an adhesive for electronic materials, such as an adhesive for a solar cell protective film or an adhesive for a gas-barrier substrate for a display element, as an adhesive for construction materials, and as an adhesive for industrial materials.

The invention claimed is:
1. An oxygen-barrier adhesive comprising:
an amorphous polyester polyol, which is obtained by polycondensation of a polyvalent carboxylic acid component and a polyhydric alcohol component,
a curing agent capable of reacting with the amorphous polyester polyol, and
a solvent,
wherein the polyvalent carboxylic acid component comprises at least one type of ortho-oriented aromatic dicarboxylic acid or anhydride thereof,
the polyhydric alcohol component comprises at least one compound selected from the group consisting of ethylene glycol, propylene glycol, butylene glycol, neopentyl glycol and cyclohexanedimethanol,
an amount of the ortho-oriented aromatic dicarboxylic acid or anhydride thereof relative to a total mass of the polyvalent carboxylic acid component is from 70 to 100% by mass, and the amorphous polyester polyol has a glass transition temperature within a range from −30° C. to 30° C.

2. An oxygen-barrier film comprising the oxygen-barrier adhesive according to claim 1, wherein the oxygen-barrier film is structured by bonding a plurality of identical or different resin films.

3. A packaging material comprising the oxygen-barrier film according to claim 2.

4. The oxygen-barrier adhesive according to claim 1, wherein the ortho-oriented aromatic dicarboxylic acid or anhydride thereof is at least one polyvalent carboxylic acid or anhydride selected from the group consisting of ortho-phthalic acid or an anhydride thereof, naphthalene-2,3-dicarboxylic acid or an anhydride thereof, naphthalene-1,2-dicarboxylic acid or an anhydride thereof, anthraquinone-2,3-dicarboxylic acid or an anhydride thereof, and 2,3-anthracenedicarboxylic acid or an anhydride thereof.

5. An oxygen-barrier adhesive, comprising:
an amorphous polyester polyol, which is obtained by polycondensation of a polyvalent carboxylic acid component and a polyhydric alcohol component, and
a curing agent capable of reacting with the amorphous polyester polyol,
wherein the polyvalent carboxylic acid component comprises at least one type of ortho-oriented aromatic dicarboxylic acid or anhydride thereof,
the polyhydric alcohol component comprises at least one compound selected from the group consisting of ethylene glycol, propylene glycol, butylene glycol, neopentyl glycol and cyclohexanedimethanol,
an amount of the ortho-oriented aromatic dicarboxylic acid or anhydride thereof relative to a total mass of the polyvalent carboxylic acid component is from 70 to 100% by mass, and
the amorphous polyester polyol has an isocyanuric ring represented by general formula (1):

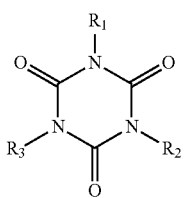

wherein each of $R_1$ to $R_3$ independently represents —$(CH_2)_{n1}$—OH (wherein n1 represents an integer of 2 to 4), or a group represented by general formula (2):

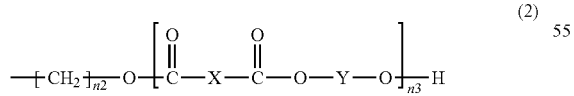

wherein n2 represents an integer of 2 to 4, n3 represents an integer of 1 to 5, X represents an arylene group selected from the group consisting of a 1,2-phenylene group, 1,2-naphthylene group, 2,3-naphthylene group, 2,3-anthraquinonediyl group and 2,3-anthracenediyl group, the arylene group may contain a substituent, and Y represents an alkylene group of 2 to 6 carbon atoms, provided that at least one of $R_1$, $R_2$ and $R_3$ is a group represented by general formula (2).

6. The oxygen-barrier adhesive according to claim 5, wherein the isocyanuric ring of general formula (1) represents 5% by mass or more of a total resin solid fraction of the oxygen-barrier adhesive.

7. The oxygen-barrier adhesive according to claim 1, wherein a number-average molecular weight of the amorphous polyester polyol is within a range from 450 to 5,000.

8. The oxygen-barrier adhesive according to claim 1, further comprising a crystalline polyester.

9. The oxygen-barrier adhesive according to claim 5, wherein a number-average molecular weight of the amorphous polyester polyol is from 450 to 5,000.

10. The oxygen-barrier adhesive according to claim 1, wherein the curing agent is a polyisocyanate.

11. A film laminate, comprising the oxygen-barrier adhesive according to claim 1.

12. A film laminate, comprising the oxygen-barrier adhesive according to claim 5.

13. The oxygen-barrier adhesive according to claim 5, further comprising:
a crystalline polyester.

14. The oxygen-barrier adhesive according to claim 1, wherein the solvent is one selected from the group consisting of ethyl acetate, butyl acetate, cellosolve acetate, acetone, methyl ethyl ketone, isobutyl ketone, cyclohexanone, tetrahydrofuran, dioxane, toluene, xylene, methylene chloride, ethylene chloride, dimethylsulfoxide and dimethyl sulfonamide.

15. The oxygen-barrier adhesive according to claim 5, wherein the solvent is one selected from the group consisting of ethyl acetate, butyl acetate, cellosolve acetate, acetone, methyl ethyl ketone, isobutyl ketone, cyclohexanone, tetrahydrofuran, dioxane, toluene, xylene, methylene chloride, ethylene chloride, dimethylsulfoxide and dimethyl sulfonamide.

16. An oxygen-barrier film comprising the oxygen-barrier adhesive according to claim 5, wherein the oxygen-barrier film is structured by bonding a plurality of identical or different resin film.

17. A packaging material comprising the oxygen-barrier film according to claim 16.

18. The oxygen-barrier adhesive according to claim 5, wherein the ortho-oriented aromatic dicarboxylic acid or anhydride thereof is at least one polyvalent carboxylic acid or anhydride selected from the group consisting of ortho-phthalic acid or an anhydride thereof, naphthalene-2,3-dicarboxylic acid or an anhydride thereof, naphthalene-1,2-dicarboxylic acid or an anhydride thereof, anthraquinone-2,3-dicarboxylic acid or an anhydride thereof, and 2,3-anthracenedicarboxylic acid or an anhydride thereof.

19. The oxygen-barrier adhesive according to claim 5, wherein the curing agent is a polyisocyanate.

* * * * *